United States Patent
Aoki

(10) Patent No.: US 6,890,283 B2
(45) Date of Patent: May 10, 2005

(54) CONTROL APPARATUS FOR CONTROLLING TRANSMISSION OF HYBRID VEHICLE

(75) Inventor: Yasuo Aoki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/429,026

(22) Filed: May 5, 2003

(65) Prior Publication Data

US 2003/0190995 A1 Oct. 9, 2003

Related U.S. Application Data

(63) Continuation-in-part of application No. 09/985,939, filed on Nov. 6, 2001, now abandoned.

(30) Foreign Application Priority Data

Nov. 13, 2000 (JP) .................................... 2000-345114
Sep. 5, 2001 (JP) .................................... 2001-268218

(51) Int. Cl.⁷ ............................................. B60K 41/02
(52) U.S. Cl. ......................................................... 477/5

(58) Field of Search ........................... 477/3, 5; 74/335, 74/336 R

(56) References Cited

U.S. PATENT DOCUMENTS

| | | | | |
|---|---|---|---|---|
| 6,019,698 A | * | 2/2000 | Lawrie et al. .................. | 477/5 |
| 6,142,907 A | * | 11/2000 | Minowa et al. ................ | 477/5 |
| 6,159,127 A | * | 12/2000 | Loeffler et al. ................ | 477/5 |
| 6,176,807 B1 | * | 1/2001 | Oba et al. ...................... | 477/5 |
| 6,251,042 B1 | * | 6/2001 | Peterson et al. ............... | 477/3 |
| 6,296,593 B1 | * | 10/2001 | Gotou et al. ................... | 477/5 |
| 6,506,139 B2 | * | 1/2003 | Hirt et al. ...................... | 477/3 |

* cited by examiner

Primary Examiner—Dirk Wright
(74) Attorney, Agent, or Firm—Armstrong, Kratz, Quintos, Hanson & Brooks, LLP

(57) ABSTRACT

A control apparatus for controlling a transmission of a hybrid vehicle. The hybrid vehicle includes an engine, a motor, and a transmission for transmitting the rotation of the engine to wheels. The transmission is constructed to engage/disengage clutches by a hydraulically operated control apparatus. The hydraulically operated control apparatus is controlled such that all the clutches are disengaged during the regeneration of the motor.

3 Claims, 17 Drawing Sheets

FIG.3

| | NEUTRAL & PARKING | 1ST | 1ST⇔2ND | 2ND | 2ND⇔3RD | 3RD | 3RD⇔4TH | 4TH |
|---|---|---|---|---|---|---|---|---|
| 1ST SOLENOID VALVE ON/OFF | | | | | | | | |
| 2ND SOLENOID VALVE ON/OFF | | | | | | | | |
| 3RD SOLENOID VALVE ON/OFF | | | | | | | | |
| 1ST SHIFT VALVE RIGHT/LEFT | | | | | | | | |
| 2ND SHIFT VALVE RIGHT/LEFT | | | | | | | | |
| 3RD SHIFT VALVE RIGHT/LEFT | | | | | | | | |
| 4TH SHIFT VALVE RIGHT/LEFT | | | | | | | | |
| 1ST LINEAR SOLENOID VALVE UPPER/LOWER | | | | | | | | |
| 2ND LINEAR SOLENOID VALVE UPPER/LOWER | | | | | | | | |
| 1ST PRESSURE REGULATING VALVE UPPER/LOWER | | | | | | | | |
| 2ND PRESSURE REGULATING VALVE UPPER/LOWER | | | | | | | | |

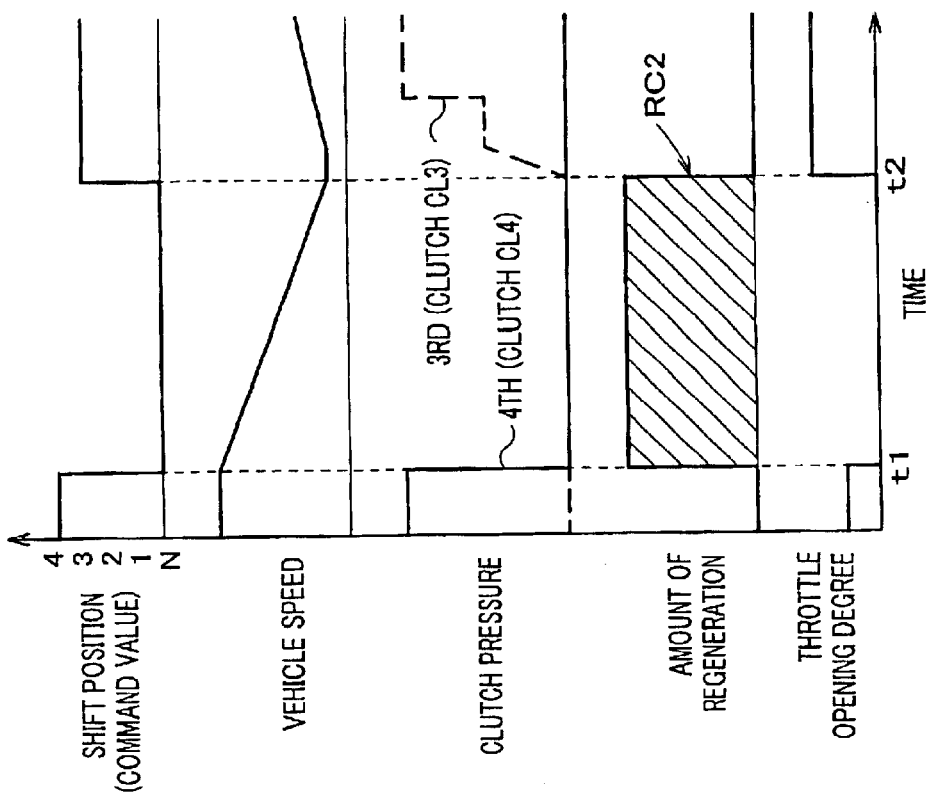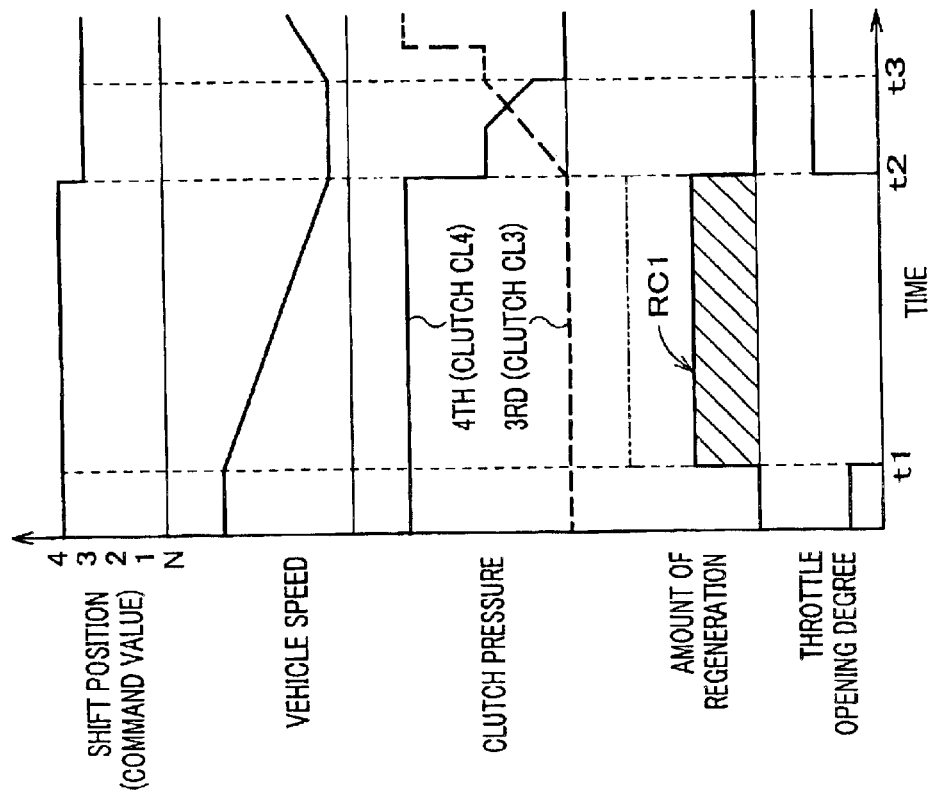

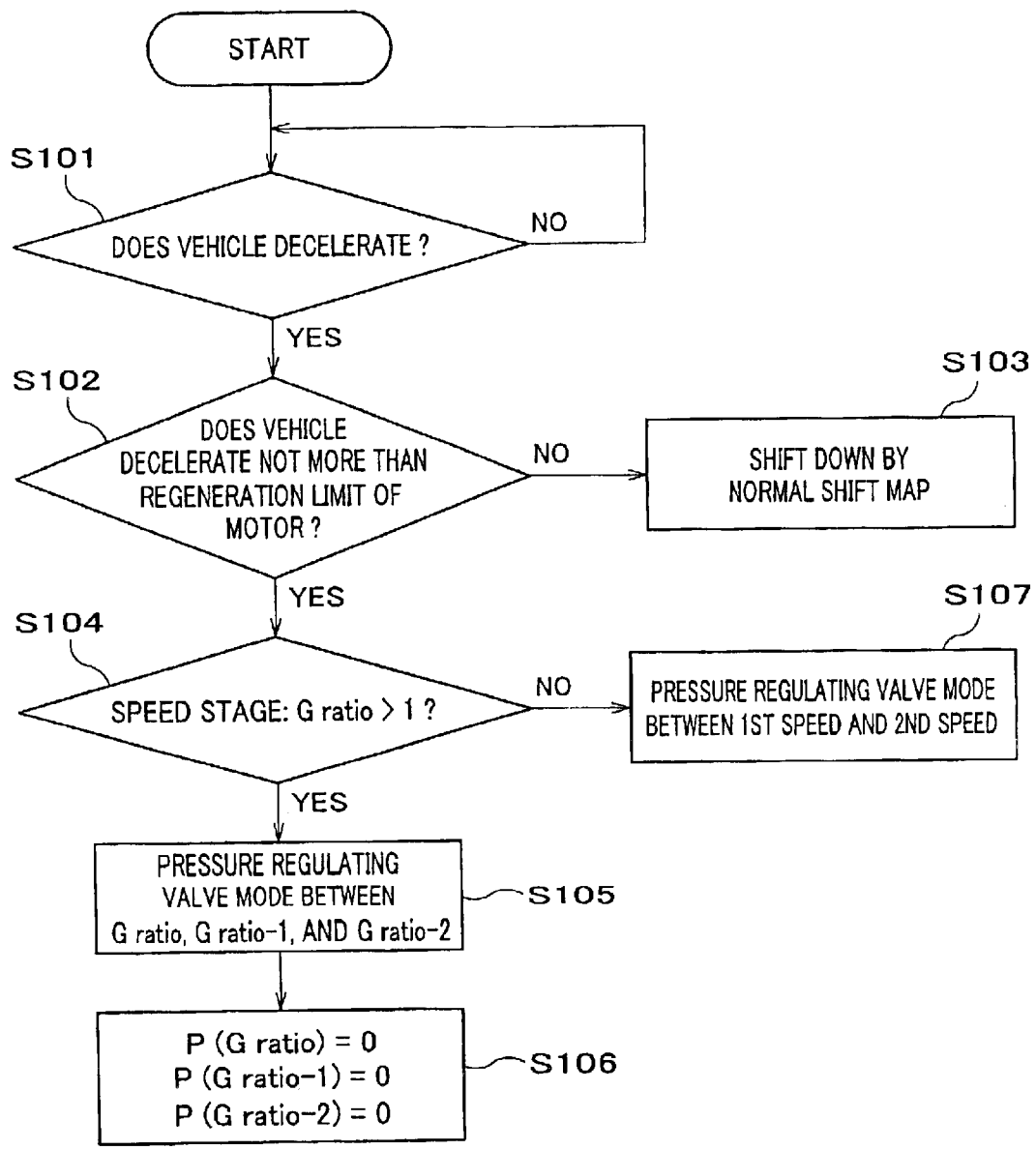

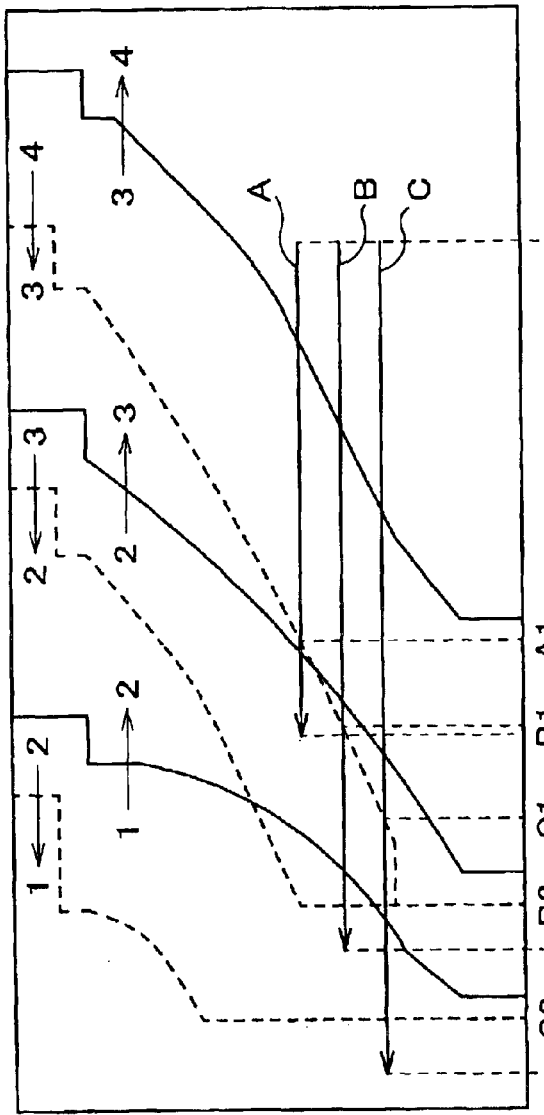
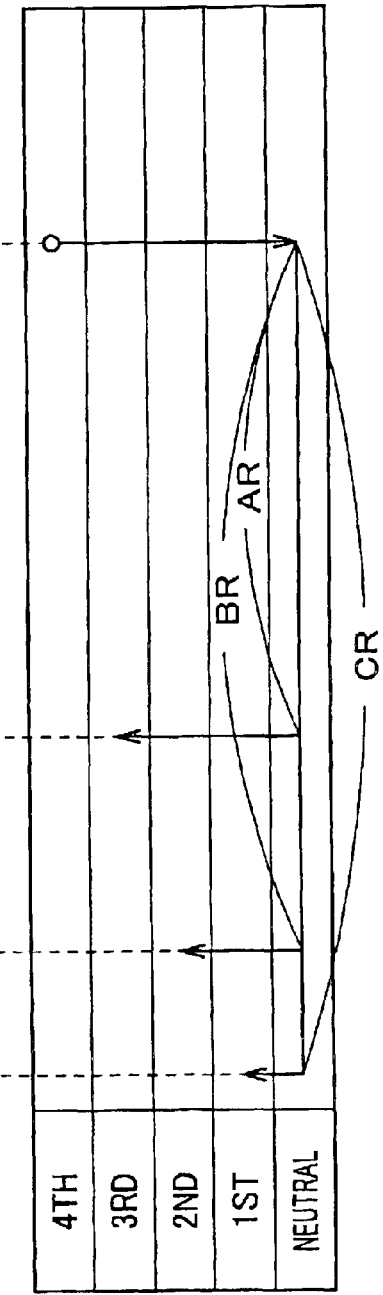
FIG.15A
FIG.15B

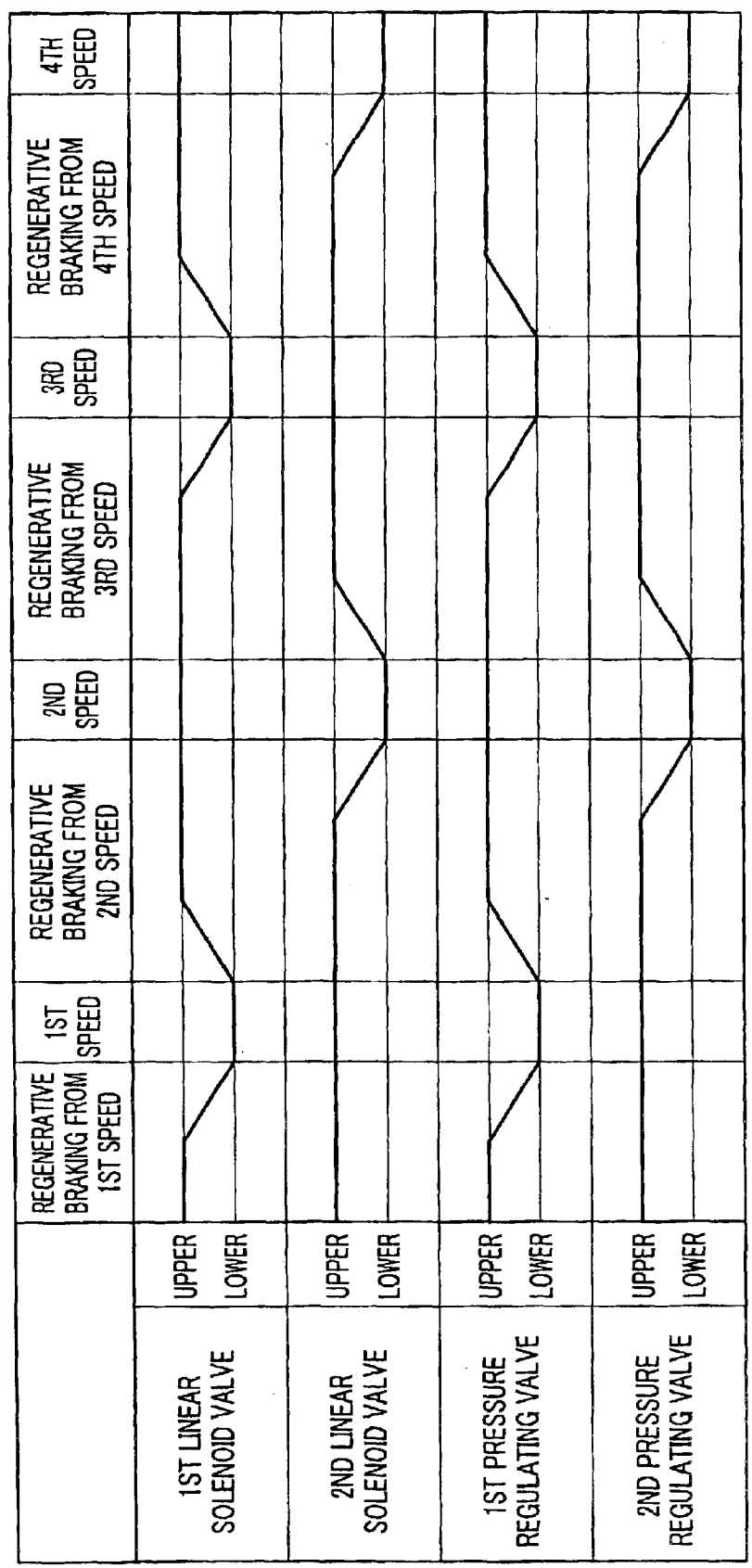

CONTROL APPARATUS FOR CONTROLLING TRANSMISSION OF HYBRID VEHICLE

This application is a Continuation-In-Part (CIP) of prior application Ser. No. 09/985,939 filed on Nov. 6, 2001, now abandoned.

FIELD OF THE INVENTION

The present invention relates to a control apparatus for controlling switching operations of a transmission mounted on a hybrid vehicle for the purpose of regenerating batteries during deceleration of the vehicle.

BACKGROUND OF THE INVENTION

In view of decreasing harmful effects on the environment, in recent years, extensive research and development work has been undertaken to provide a hybrid vehicle wherein an engine and a motor are mounted as power sources to drive the vehicle.

Of these hybrid vehicles, a so-called parallel hybrid vehicle is known. The parallel hybrid vehicle is a type of hybrid vehicle having an engine and a motor arranged in parallel, and in accordance with a required driving force or road conditions, at least one of the engine and the motor is selectively driven or both of the engine and the motor are driven. In the parallel hybrid vehicle, an operating ratio of the engine and the motor can be selected in accordance with the required driving force or road conditions, which leads to improvement of the fuel economy and decrease in the amount of exhaust gas. The parallel hybrid vehicle further improves fuel economy by regenerative braking during deceleration of the vehicle. During regenerative braking, the motor converts kinetic energy of the vehicle into electric energy to charge the battery.

As a conventional parallel hybrid vehicle to perform regenerative braking (hereinafter simply referred to as a "hybrid vehicle"), Japanese Laid-open patent application Ser. No. 9-9415 discloses a hybrid vehicle where in the transmission sets in a higher speed stage during the deceleration of the vehicle. For example, when the driver applies a brake while a hybrid vehicle with a four speed automatic transmission runs at the third speed, the transmission is set in the fourth speed, and with the transmission kept in the fourth speed stage, the vehicle decreases and stops by regenerative braking. Because the drag resistance of the engine can be decreased with the transmission set in a higher speed stage during the deceleration of the vehicle, it is possible to decrease heat energy to be consumed as friction heat caused by the engine brake. This leads to increased regenerative electric energy and thus increased amount of regenerative electric power to be charged in the battery that is connected to the motor.

However, if this hybrid vehicle reaccelerates at the time of deceleration, a difference may arise between rotation speeds of the wheels, engine speed and the current speed stage of the transmission. Such a difference unpreferably causes a shock when the transmission sets in a speed stage.

In the case where the amount of regenerative electric power is increased by regenerative braking, it is preferable that the drag resistance of the engine is decreased as much as possible. However, in order to decrease the drag resistance of the engine further, it is necessary to provide a further transmission speed stage corresponding to a higher speed stage or to provide a mechanism which engages or disengages driving systems of the engine and the motor, which requires a novel construction as well as complicated controls.

SUMMARY OF THE INVENTION

In view of the above, the present invention seeks to provide a control apparatus for controlling a transmission of a hybrid vehicle, which improves regeneration efficiency of regenerative energy at the time of regenerative braking and which performs smooth shift operations between transmission speed stages.

According to a first aspect of the present invention, there is provided a control apparatus for controlling a transmission of a hybrid vehicle. The hybrid vehicle comprises an engine, a motor for transmitting power to wheels independently of the engine, and a transmission arranged between the engine and the wheels and having at least one power connect/disconnect means. The control apparatus includes a controller for engaging or disengaging the power connect/disconnect means in accordance with driving conditions. The controller is controlled to disengage the power connect/disconnect means during regeneration of the motor.

With this construction of the control apparatus, the controller disengages the power connect/disconnect means at the time of regeneration of the motor, which allows the transmission to completely disengage the rotation of the engine and the rotation of the wheels. Therefore, it is possible to prevent kinetic energy of the hybrid vehicle from being lost as thermal energy resulting from drag resistance of the engine. This results in improved regeneration efficiency of the regenerative energy by means of the motor.

According to a second aspect of the present invention, in the aforementioned control apparatus, the transmission forms a plurality of speed stages by engaging or disengaging a plurality of friction elements. Further, the transmission is constructed to select a first friction element which forms a speed stage just before the regeneration of the motor and a second friction element which forms a speed stage lower than that formed by the first friction element during the regeneration of the motor, and the transmission stands ready to engage the first and second friction elements during the regeneration of the motor.

Generally, vehicle speed lowers as the result of regenerative braking. According to the present invention, during the regenerative braking of the hybrid vehicle, the control apparatus for the transmission stands ready to engage a speed stage (second speed stage) lower than the speed stage (first speed stage) just before the regeneration. Therefore, it is possible to smoothly form an appropriate speed stage required for reacceleration after regenerative braking. Herein, the term "stand ready to engage" indicates a condition in which a speed stage just before regeneration and a lower speed stage are engageable in the case of an automatic transmission utilizing a shift valve, a condition in which a play in the stroke of the subject friction element is shortened in the case of a direct control-type automatic transmission, and a condition in which a play in the transmission actuator is decreased in the case of other automatic transmission types.

BRIEF DESCRIPTION OF THE DRAWINGS

A preferred embodiment of the present invention will be described below, by way of example only, with reference to the accompanying drawings, in which:

FIG. 3 shows an operating sequence diagram illustrating shift valves, pressure regulating valves and control valves provided in the hydraulically operated control apparatus when transmission shift operations of the hybrid vehicle are performed;

FIG. 12A is a graph showing the amount of regenerative electric energy obtained during regenerative braking without the use of a pressure regulating valve mode, and FIG. 12B is a graph showing the amount of regenerative electric energy with the use of the pressure regulating valve mode;

FIG. 14 is a flow chart in the instance where regenerative braking is carried out in the pressure regulating valve mode when a brake is applied to the hybrid vehicle;

FIG. 15A is a shift map in the instance where transmission shift operations are performed in the normal mode, and FIG. 15B explains shift change operations in the pressure regulating valve mode during regenerative braking;

FIG. 16 shows an operating sequence diagram illustrating operations of linear solenoid valves and pressure regulating valves during the pressure regulating valve mode.

DESCRIPTION OF THE PREFERRED EMBODIMENT

Figure 1:
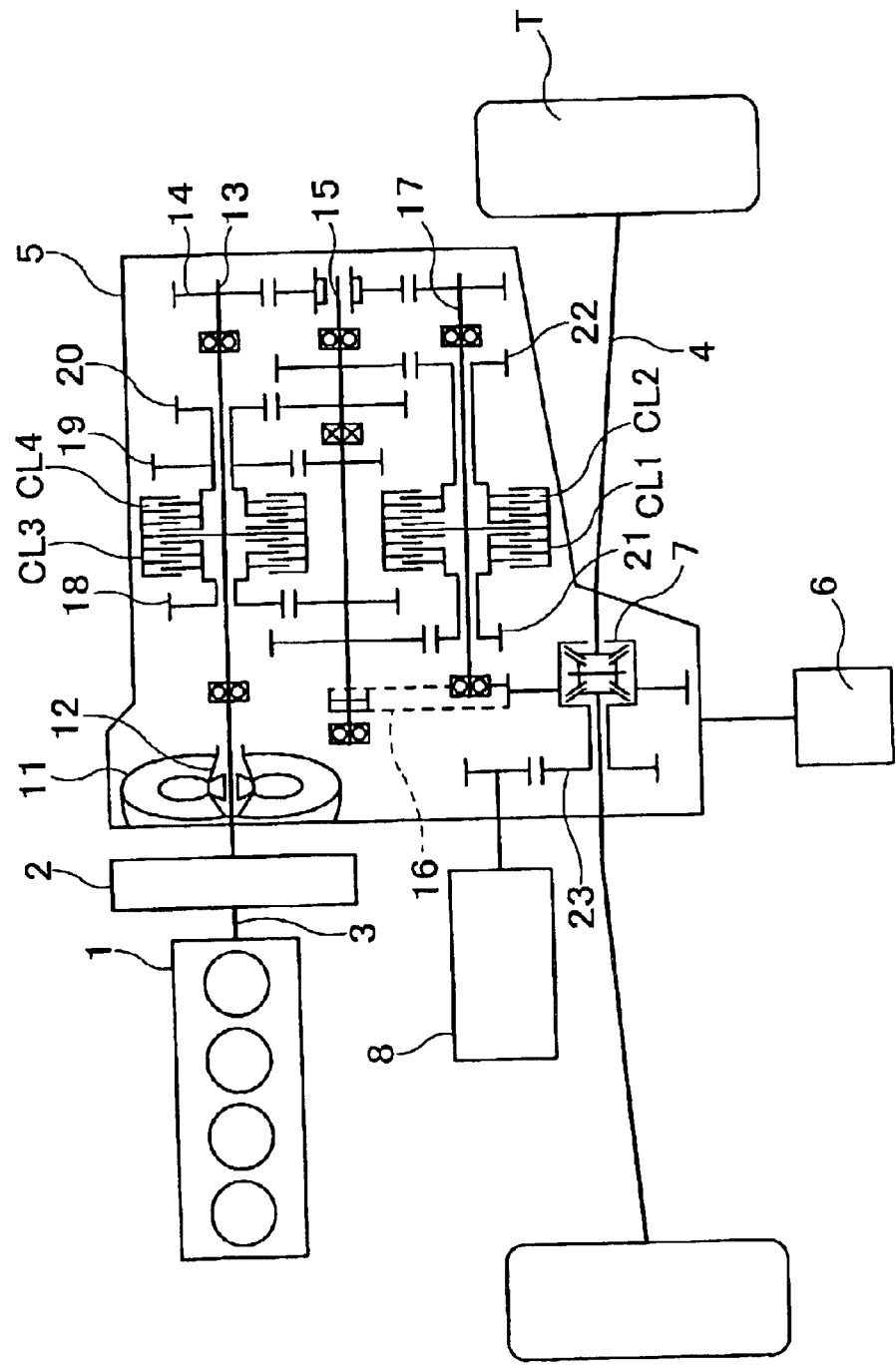
FIG. 1 shows a system arrangement of a parallel hybrid vehicle including a hydraulically operated control apparatus according to the invention.

A preferred embodiment of the present invention will now be described in detail with reference to the drawings, in which FIG. 1 shows a system arrangement of a parallel hybrid vehicle including a hydraulically operated control apparatus according to the present invention. In the following description, a transmission referred to is a four speed automatic transmission.

As shown in FIG. 1, the parallel hybrid vehicle (hereinafter simply referred to as a "hybrid vehicle") includes an engine 1 for driving wheels T, a motor 2 arranged coaxially with the engine 1, a transmission 5 for varying the number of rotations of a crank shaft 3 to be rotated by the engine 1 and the motor 2 and for transmitting it to an output shaft 4, a hydraulically operated control apparatus 6 as a controller for controlling the transmission 5, and a motor 8 directly connected to the output shaft 4 through a differential gears 7 of the transmission 5. Non-illustrated ECU (electrical control unit) controls these components. Herein, the hydraulically operated control apparatus 6 and ECU correspond to the control apparatus defined in the claims.

The transmission 5 includes a primary shaft 13 as an input shaft to be connected or disconnected to the crank shaft 3 through a lock-up clutch 12 of a fluid torque converter 11, a secondary shaft 15 to be engaged with the primary shaft 13 through a gear train 14 and the like, an intermediate shaft 17 to be engaged with the secondary shaft 15 through a gear train 16, and differential gears 7 for transmitting the rotation of the intermediate shaft 17 to the output shaft 4.

Provided between the primary shaft 13 and the secondary shaft 15 are a gear train 18 which forms a third speed stage and a hydraulic clutch CL3, and a gear train 19 which forms a fourth speed stage and a hydraulic clutch CL4. A gear train 20 for reverse movement is also provided between the primary shaft 13 and the secondary shaft 15. In the reverse drive of the hybrid vehicle, the driver switches a select lever such that the hydraulic clutch CL4 and the gear train 20 convert the rotation of the primary shaft 14 in the reverse direction and transmit the reverse rotation to the secondary shaft 15.

Provided between the secondary shaft 15 and the intermediate shaft 17 are a gear train 21 which forms a first speed stage and a hydraulic clutch CL1, and a gear train 22 which forms a second speed stage and a hydraulic clutch CL2.

Supply of pressure oil to or discharge of pressure oil from respective hydraulic clutches CL1 to CL4 may be referred to as a power connect/disconnect. In the following descriptions, the hydraulic clutches CL1 to CL4 are merely referred to as clutches CL1 to CL4.

The ECU receives signals from a vehicle speed sensor (not shown), sensors for detecting the number of rotations of the respective rotational shafts 3, 4, 13, 15, and 17, a position sensor for the select lever, etc. The ECU transmits drive signals to the engine 1 and the motors 2, 8 as well as outputs control signals to the hydraulically operated control apparatus 6 such that pressure oil is supplied to or discharged from the respective clutches CL1 to CL4. Upon switching the speed stage of the transmission, the ECU selects one of the clutches CL1 to CL4 and outputs a control signal to supply the selected clutch with pressure oil. When the selected clutch is engaged, the rotation of the primary shaft 13, secondary shaft 15 or intermediate shaft 17 is transmitted to the gear train 18 to 22 corresponding to the selected clutch CL1 to CL4.

In this hybrid vehicle, the engine 1 and the motors 2, 8 are driven in combination in accordance with driving conditions of the hybrid vehicle to thereby improve fuel economy and to decrease the amount of emission gas. For example, when the hybrid vehicle starts or when the required driving force is small, the wheels T are driven only by the motor 8 with the rotation of the motor 8 transmitted to the output shaft 4 via the final gear 23. When a load applied to the motor 8 becomes higher than a certain level, the motor 2 actuates the engine 1 such that the wheels T are driven by the driving forces of the motor 8 and the engine 1.

According to this preferred embodiment, at the time of braking of the hybrid vehicle during which kinetic energy of the vehicle is converted into electric energy to charge the battery, all of the friction elements CL1 to CL4 are disengaged, so that the rotation of the engine 1 and the rotation of the output shaft 4 are disconnected at the transmission 5. Therefore, regenerative energy is effectively charged in the battery in a manner independent of the rotation of the engine 1. Regeneration of energy during the regenerative braking may be performed by the motor 2 via the transmission 5. However, in terms of regeneration efficiency, it is more preferable that regeneration of energy is performed by the motor 8.

With reference to the hydraulic circuit diagram shown in FIG. 2, the hydraulically operated control apparatus 6 for controlling engagement/disengagement of each friction element CL1 to CL4 of the transmission 5 will be described below.

Figure 2:
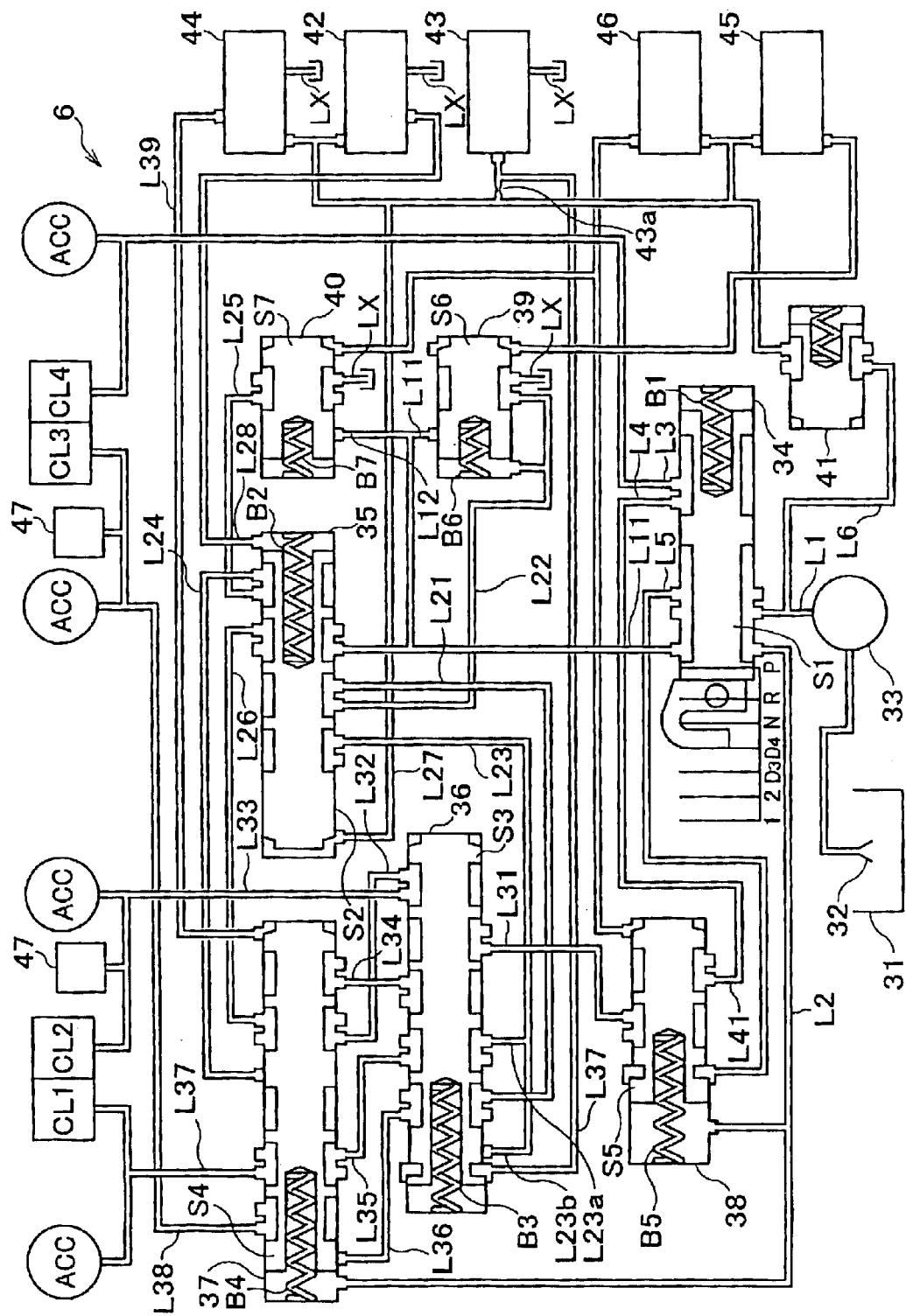
FIG. 2 is a hydraulic circuit diagram of the hydraulically operated control apparatus.

As shown in FIG. 2, hydraulic fluid in an oil pan 31 is drawn by a suction strainer 32 and thereafter pressurized by a hydraulic pump 33. The control apparatus 6 selects a suitable clutch CL1 to CL4 and supplies the selected clutch with pressure oil.

Arranged between the hydraulic pump 33 and the respective friction elements CL1 to CL4 are a manual valve 34 cooperative with a select lever for switching pressure oil supply paths, a first shift valve 35, a second shift valve 36, a third shift valve 37, and a fourth shift valve 38. The control apparatus 6 is further provided with a first pressure regulating valve 39 and a second pressure regulating valve 40 as transmission control valves for smoothly supplying pressure oil to the clutch CL1 to CL4 and smoothly discharging the pressure oil from the clutch CL1 to CL4 during the transient period in which the speed stage of the transmission is switched.

Components of the control apparatus 6 will be described below.

The manual valve 34 is constructed such that a spool S1 moves in right and left directions in accordance with the shift position of the select lever. In the case where the shift position is set in a D4 range as an automatic transmission position from the first to the fourth speed, a D3 range as an automatic transmission position from the first to the third speed, a 2 range to hold the second speed, a 1 range to hold the first speed, a P (parking) range, or a N (neutral) range, the pressure oil line L1 is connected to the pressure oil lines L2 and L5 and the pressure oil line L11. The pressure oil line L3 is connected to the pressure oil line L4.

The first shift valve 35 selectively supplies the second shift valve 36, the third shift valve 37, the first pressure regulating valve 39, or the second pressure regulating valve 40 with pressure oil that is supplied from the manual valve 34 via the pressure oil line L11. To be more specific, when the spool S2 is in the left position as illustrated in FIG. 2, the pressure oil line L11 and the pressure oil line L26 are connected so that pressure oil is supplied to the third shift valve 37. At the same time, the pressure oil line L21 and the pressure oil line L22 are connected so that the first pressure regulating valve 39 and the second shift valve 36 are connected in fluid communication. Further, the pressure oil line L24 and the pressure oil line L25 are connected so that the second pressure regulating valve 40 and the third shift valve 37 are connected in fluid communication.

Meanwhile, when the spool S2 is in the right position, the pressure oil line L11 and the pressure oil line L21 are connected so that pressure oil is supplied to the second shift valve 36. At the same time, the pressure oil line L22 and the pressure oil line L23 are connected so that the fluid communication between the first pressure regulating valve 39 and the second shift valve 36 can be varied. Further, the pressure oil line L25 and the pressure oil line L26 are connected so that the fluid communication between the second pressure regulating valve 40 and the third shift valve 37 can be varied.

The first shift valve 35 is provided with pressure oil at the left side of the spool S2 via the pressure oil line 27. Pressure oil flows through the pressure oil line L6 that is branched off from the pressure oil line L1 directly connected to the hydraulic pump 33, and is decompressed by the modulator valve 41. The pressure oil thus decompressed by the modulator valve 41 then flows through the pressure oil line 27 and to the first shift valve 35. A spring B2 is inserted at the right side of the spool S2 to urge the spool S2 to the left side. Further, the first shift valve 35 is provided with pressure oil at the right side of the spool S2 via the pressure oil line L28. The pressure oil decompressed at the modulator valve 41 is branched off and flows into a first solenoid valve 42 and further to the first shift valve 35 via the pressure oil line L28.

The first solenoid valve 42 is actuated to perform an ON/OFF operation when it receives a control signal from the ECU. When the first solenoid valve 42 is OFF, decompressed pressure oil is supplied to the right side of the spool S2 via the pressure oil line L28 to thereby move the spool S2, together with the resilient action of the spring B2, toward the left side. Meanwhile, when the first solenoid valve 42 is ON, the pressure oil supplied to the right side of the spool S2 is discharged from the discharge port Lx to the oil pan 31 to thereby move the spool S2 toward the right side.

The second shift valve 36 connects the pressure oil line L23a branched off from the pressure oil line L23 and the pressure oil line L35 when the spool S3 is in the right position as illustrated in FIG. 2. At the same time, the pressure oil line L21 and the pressure oil line L36 are connected, and the pressure oil line L32 and the pressure oil line L33 are connected to supply the clutch CL2 with pressure oil or to discharge the pressure oil from the clutch CL2. Meanwhile, when the spool S3 is in the left position, the pressure oil line L31 and the pressure oil line L34 are connected. At the same time, the pressure oil line L23b branched off from the pressure oil line L23 and the pressure oil line L36 are connected, and the pressure oil line L21 and the pressure oil line L35 are connected, respectively.

The second solenoid valve 43 supplies, when the valve 43 is OFF, the spool S3 of the second shift valve 36 with pressure oil that is restricted at the restriction 43a via the pressure oil line L37, so that the spool S3 moves to the left side against the resilient force of the spring B3. When the second solenoid valve 43 is ON, the pressure oil supplied to the second shift valve 36 flows through the pressure oil line L37 and is discharged from the discharge port Lx of the second solenoid valve 43. Therefore, the spool S3 is urged to the right position under the resilient action of the spring B3.

The third shift valve 37 connects the pressure oil line L32 and the pressure oil line L26 when the spool S4 is in the right position as illustrated in FIG. 2. At the same time, the pressure oil line L35 and the pressure oil line L37 are connected to supply the clutch CL1 with pressure oil or to discharge the pressure oil from the clutch CL2. Meanwhile, when the spool S4 is in the left position, the pressure oil line L32 and the pressure oil line L24 are connected, and the pressure oil line L34 and the pressure oil line L26 are connected, respectively. Further, the pressure oil line L36 and the pressure oil line L38 are connected to supply the clutch CL3 with pressure oil or to discharge the pressure oil from the clutch CL3.

The third shift valve 37 moves between the right position and the left position in accordance with the balance between the decompressed pressure oil that is supplied to the right side of the spool S4 via the pressure oil line L39 by the actuation of the third solenoid valve 44 and the pressure oil that is supplied to the left side of the spool S4 via the pressure oil line L2 so as to urge the spool S4 under the resilient action of the spring B4. The construction of the third solenoid valve 44 is substantially the same as the first solenoid valve 42, and detailed description thereof will be omitted.

The fourth shift valve 38 connects the pressure oil line L31 and the pressure oil line L41 when the spool S5 moves from the right position illustrated in FIG. 2 to the left position, so that pressure oil is supplied to the clutch CL4 or the supplied pressure oil is discharged from the clutch CL4. When the second linear solenoid valve 46 turns ON, pressure oil is supplied to the right side of the spool S5, so that the spool S5 of the fourth shift valve 38 moves to the left side against the resilient force of the spring B5 and the pressure oil supplied from the pressure oil line L2. In this instance, because pressure oil is supplied from the pressure oil line L5, the spool S5 is retained in the left position even after the second linear solenoid valve 46 is OFF.

The first pressure regulating valve 39 moves the spool S6 from the right position illustrated in FIG. 2 to the left position by the ON/OFF operations of the first linear solenoid valve 45. Therefore, the fluid communication of the pressure oil line L22 connected to the first shift valve 35 is switched between the discharge port Lx and the pressure oil line L13 branched off from the pressure oil line L11. With the provision of the first linear solenoid valve 45, a gradual and smooth movement of the spool S6 can be achieved.

Similarly, the second pressure regulating valve 40 moves the spool S7 from the right position illustrated in the figure to the left position by the ON/OFF operations of the second linear solenoid valve 46. Therefore, the fluid communication of the pressure oil line L25 connected to the first shift valve 35 is switched between the discharge port Lx and the pressure oil line L12 branched off from the pressure oil line L11.

The control apparatus 6 is provided with a shift valve (not shown) and a solenoid valve (not shown) to engage or disengage the lock-up clutch 12 of the fluid torque converter 11 as illustrated in FIG. 1. When the select lever is set in the R range as a reverse drive, a servo valve (not shown) selects the gear train 20 for reverse movement as illustrated in FIG. 1.

Each of the clutches CL1 to CL4 is engaged by the supply of pressure oil and transmits the rotation of each shaft 13, 15, 17 to the other shaft 13, 15, 17. Each clutch CL1 to CL4 is of known structure. Each of the pressure oil lines L33, L37, L38, and L41 for supplying pressure oil to the corresponding clutch CL1 to CL4 is provided with an accumulator ACC to gradually supply pressure oil to the clutch CL1 to CL4. Further, a pressure switch 47 is provided for the clutch CL2 and the clutch CL3, respectively. The pressure switch 47 outputs an ON signal when the pressure of pressure oil reaches to a certain level. This makes it possible to recognize the pressure of pressure oil to be supplied to the clutch CL2 and the clutch CL3.

With reference to FIG. 3 illustrating the operating sequence diagram and FIGS. 4 through 10 schematically illustrating the hydraulic circuit diagram shown in FIG. 2, upshift operations from the first speed stage to the fourth speed stage will be described below. In FIGS. 4 through 10, the spools S6, S7 of the first and second pressure regulating valves 39, 40 move in the vertical directions, and FIG. 3 indicates the movements of these pressure regulating valves in the vertical directions.

Figure 4:
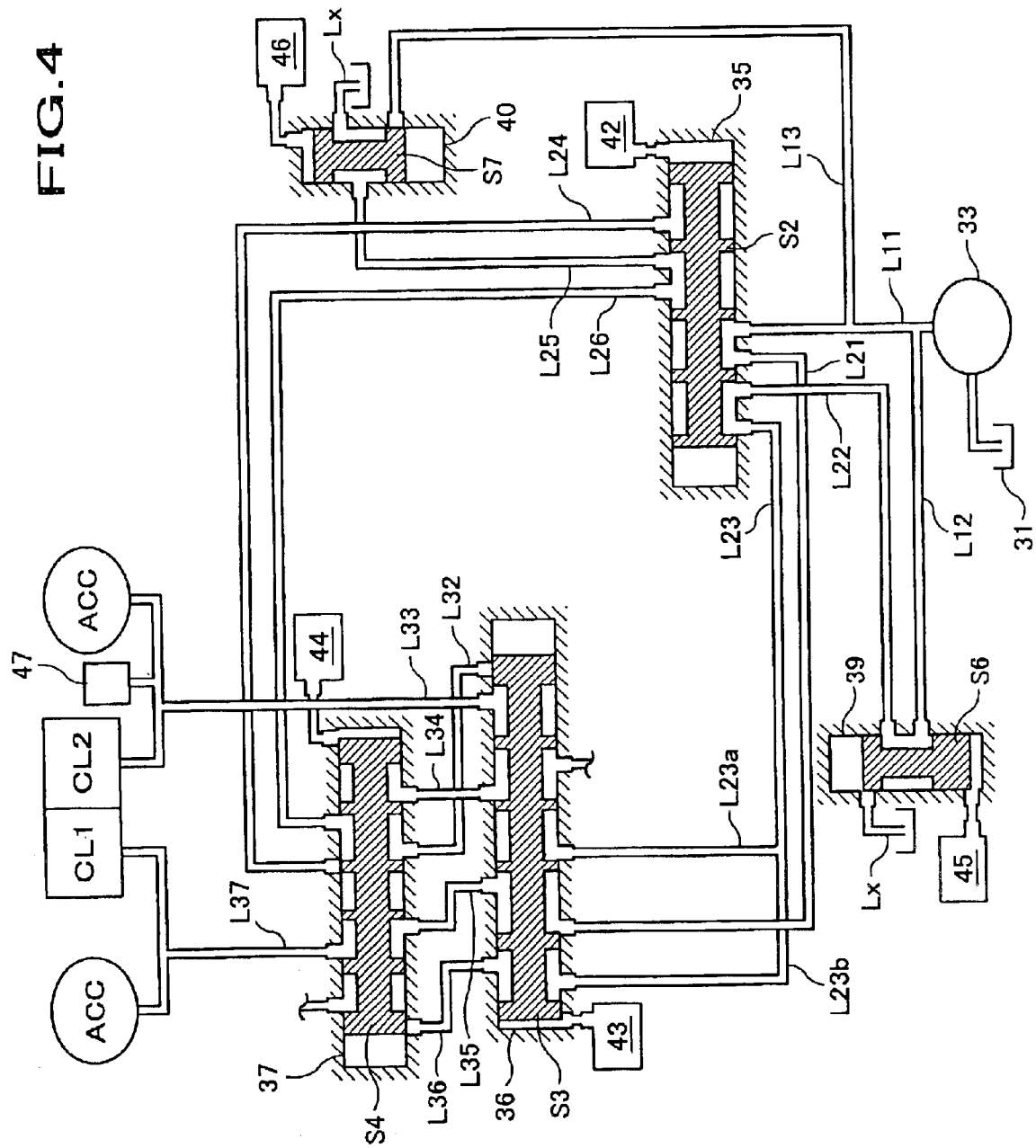
FIG. 4 is a hydraulic circuit diagram illustrating a state wherein the transmission holds in the first speed stage.

As shown in FIG. 4, when the hybrid vehicle runs with the transmission set in the first speed, pressure oil is supplied only to the clutch CL1. In this instance, pressure oil is supplied from the hydraulic pump 33 to the first shift valve 35 via the pressure oil line L11. Oil flows from the first shift valve 35 pressure to the second shift valve 36 via the pressure oil line L21, and further to the third shift valve 37 via the pressure oil line L35, and is supplied to the clutch CL1 via the pressure oil line L37. The instance where pressure oil is retained without passing through the first and second linear solenoid valves 45, 46 is hereinafter referred to as a "line pressure mode".

As shown in FIG. 3, in the case of an upshift from the first speed to the second speed, the second solenoid valve 43 is switched from OFF to ON, and the first and second linear solenoid valves 45, 46 are smoothly actuated, so that pressure oil is discharged from the clutch CL1 and instead the clutch CL2 is supplied with pressure oil. The second speed stage is therefore formed.

Figure 5:
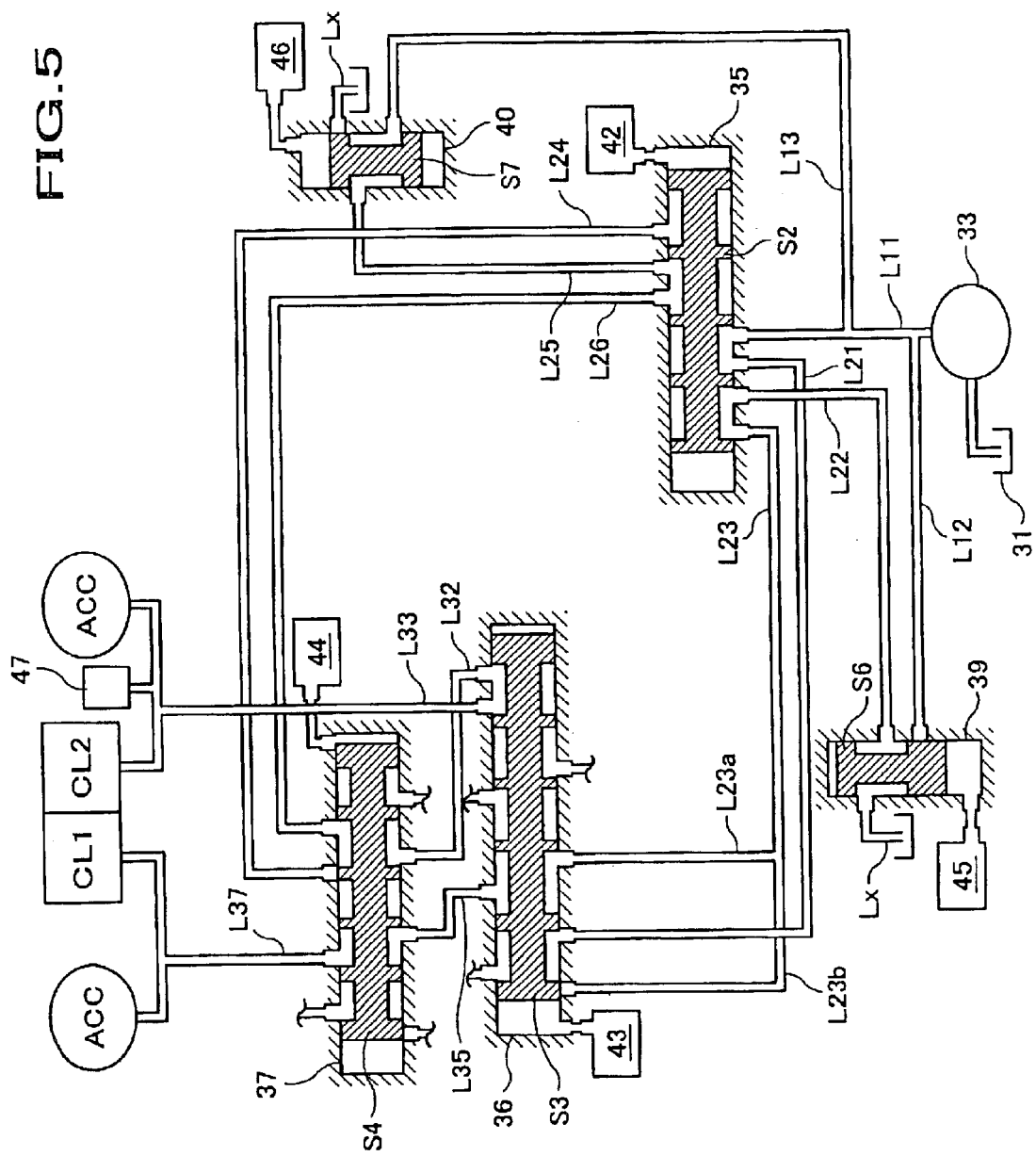
FIG. 5 is a hydraulic circuit diagram illustrating a transient state wherein the transmission shifts from the first speed stage to the second speed stage.

In this instance, as illustrated in FIG. 5, when the second solenoid valve 43 becomes ON, the spool S3 of the second shift valve 36 shifts to the right position, so that the pressure oil line L23a and the pressure oil line L35 are connected. Meanwhile, the spool S6 of the first pressure regulating valve 39 shifts to the upper position. The pressure oil that has been supplied to the clutch CL1 then flows through the pressure oil line L35 into the second shift valve 36, and further through the pressure oil line L23a (and the pressure oil line L23) into the first shift valve 35, and is discharged from the discharge port Lx of the first pressure regulating valve 39 via the pressure oil line L22.

At the same time, the pressure oil line L32 and the pressure oil line L33 are connected at the second shift valve 36. Meanwhile, the spool S7 of the second pressure regulating valve 40 shifts to the lower position. Pressure oil then flows from the pressure oil line L13 that is branched off from the pressure oil line L11 connected to the hydraulic pump 33 into the second pressure regulating valve 40, and through the pressure oil line L25 into the first shift valve 35, and further through the pressure oil line L26 into the third shift valve 37. Furthermore, pressure oil flows from the third shift valve 37 through the pressure oil line L32 and into the second shift valve 36, and is supplied to the clutch CL2 via the pressure oil line L33.

As previously described, because the spool S7 of the second pressure regulating valve 40 gradually lowers, it is possible to prevent pressure oil from being supplied abruptly to the clutch CL2. Therefore, a shift shock does not occur when the clutch CL2 is engaged. The instance where pressure oil is supplied to or discharged from the clutch via the first linear solenoid valve 45 or the second linear solenoid valve 46 is hereinafter referred to as a "transient period mode".

Figure 6:
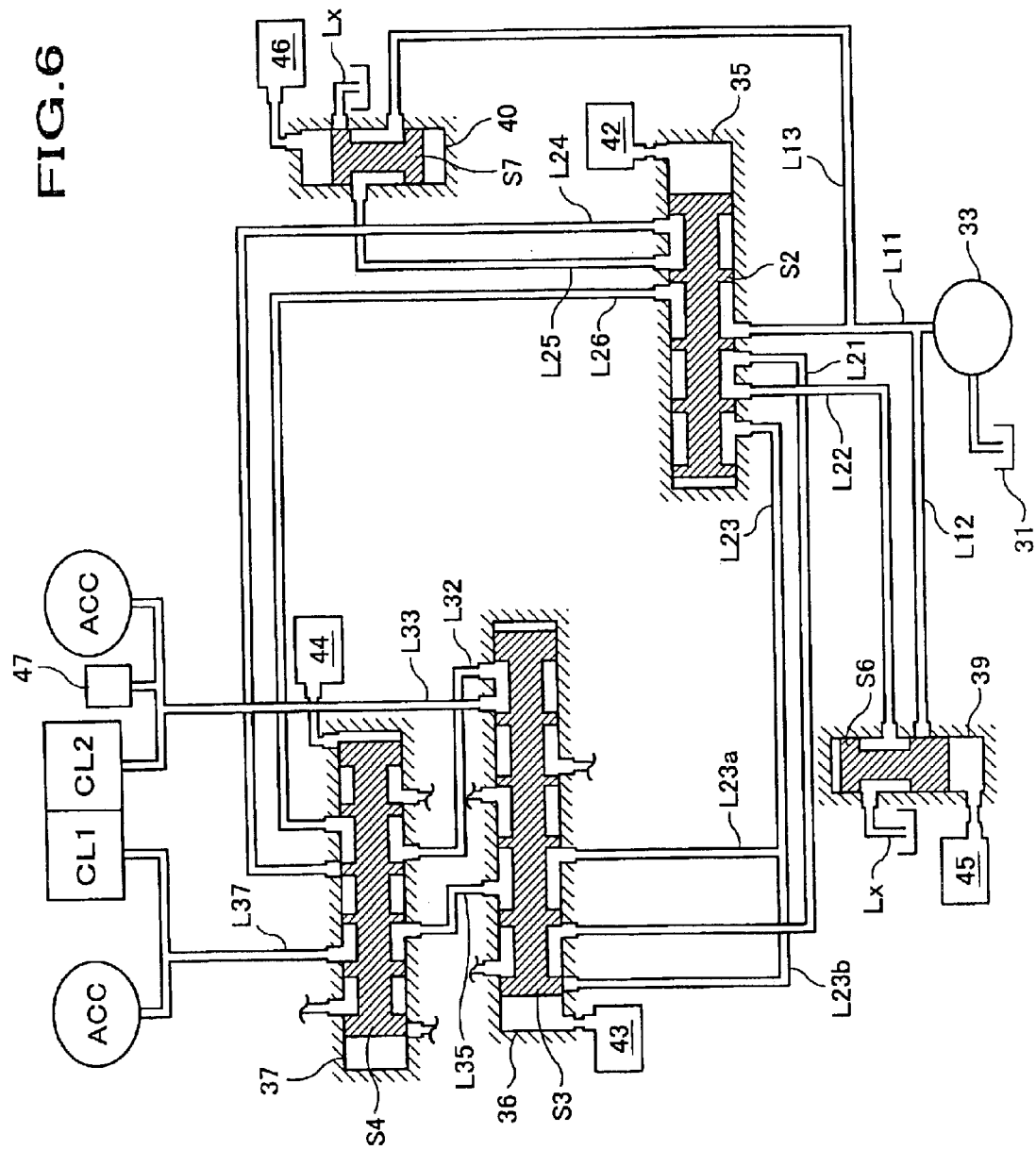
FIG. 6 is a hydraulic circuit diagram illustrating a state wherein the transmission holds the second speed stage.

When the upshift to the second speed is completed, the first solenoid valve 42 is switched from ON to OFF as illustrated in FIG. 3, so that the spool S2 of the first shift valve 35 moves to the left position to shift to the line pressure mode. As shown in FIG. 6, the pressure oil line L11 and the pressure oil line L26 are connected at the first shift valve 35, and through this pressure oil circuit pressure oil is supplied to the clutch CL2. By switching the first solenoid valve 42, pressure oil applied to the clutch CL2 increases. However, because the connection of the clutch CL2 has been completed, no shift shock arises due to increase of pressure oil.

In the case of an upshift from the second speed to the third speed, operation of the control apparatus proceeds to the transient period mode. As shown in FIG. 3, the third solenoid valve 44 is switched from ON to OFF, and the first linear solenoid valve 45 and the second linear solenoid valve 46 are actuated to linearly shift to the lower position and the upper position, respectively, so that pressure oil is discharged from the clutch CL2 and instead the clutch CL3 is supplied with pressure oil. The third speed stage is therefore formed.

Figure 7:
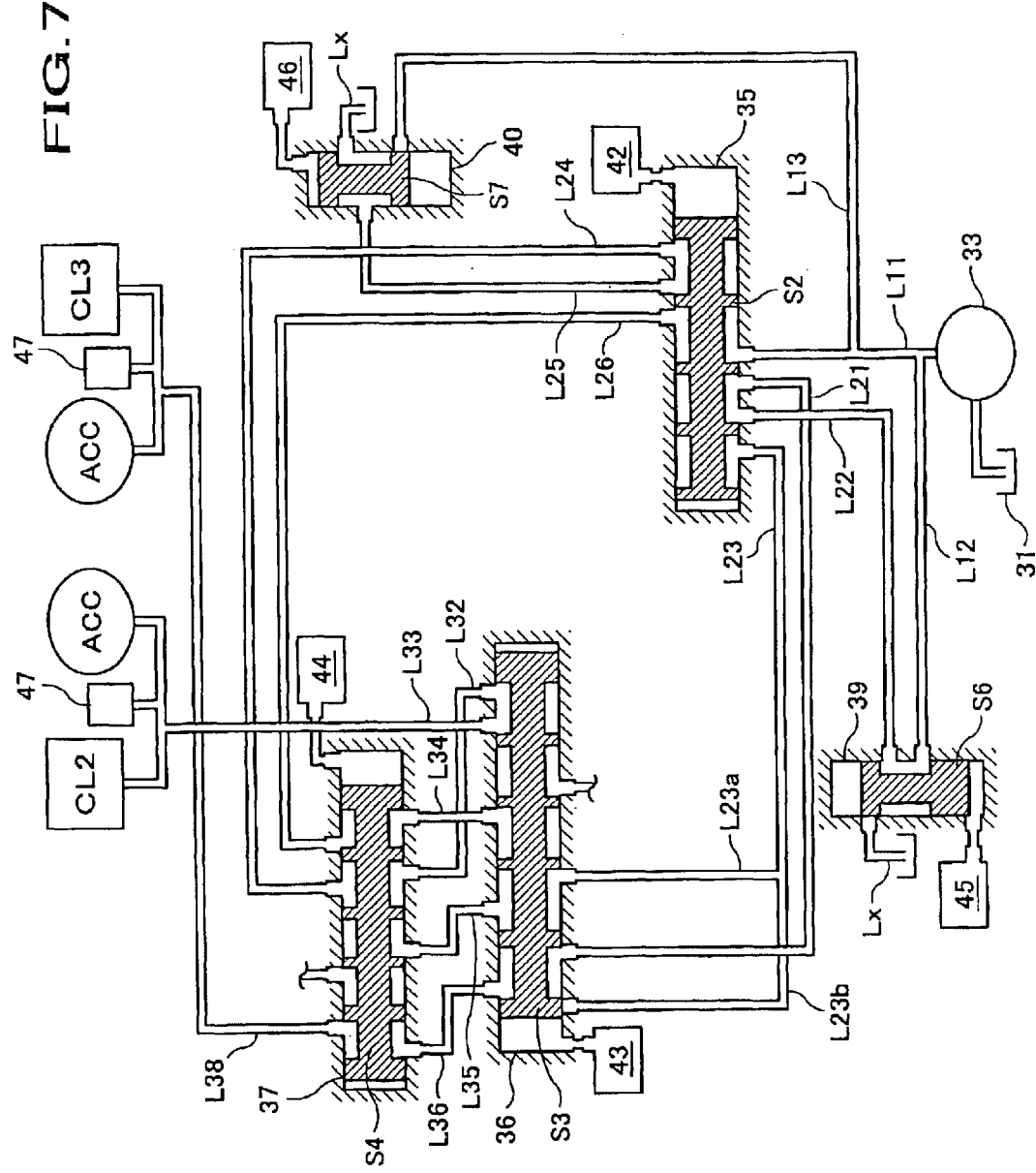
FIG. 7 is a hydraulic circuit diagram illustrating a transient state wherein the transmission shifts from the second speed stage to the third speed stage.

In this instance, as illustrated in FIG. 7, the spool S4 of the third shift valve 37 shifts to the left position, so that the pressure oil line L32 and the pressure oil line L24 are connected. Meanwhile, the spool S7 of the second pressure regulating valve 40 gradually shifts to the upper position. The pressure oil that has been supplied to the clutch CL2 then flows through the pressure oil line L33 into the second shift valve 36, and through the pressure oil line L32 into the third shift valve 37, and further through the pressure oil line L24 into the first shift valve 35, and is discharged from the discharge port Lx of the second pressure regulating valve 40 via the pressure oil line L25.

At the same time, the pressure oil line L36 and the pressure oil line L38 are connected at the third shift valve 37. Meanwhile, the spool S6 of the first pressure regulating valve 39 shifts to the lower position. Pressure oil then flows from the pressure oil L12 that is branched off from the pressure oil line L11 connected to the hydraulic pump 33 into the first pressure regulating valve 39, and through the pressure oil line L22 into the first shift valve 35, and further through the pressure oil line L21 into the second shift valve 36. Furthermore, pressure oil flows from the second shift valve 36 through the pressure oil line L36 and into the third shift valve 37, and is supplied to the clutch CL3 via the pressure oil line L38.

In this instance, a shift shock due to engagement of the clutch CL3 can be prevented by the operation of the first linear solenoid valve 45.

When the upshift to the third speed is completed, the first solenoid valve 42 is switched from OFF to ON, so that the spool S2 of the first shift valve 35 moves to the right position to shift to the line pressure mode. Therefore, the pressure oil line L11 and the pressure oil line L21 are connected at the first shift valve 35, and through this pressure oil circuit pressure oil is supplied to the clutch CL3. By switching the first solenoid valve 42, pressure oil applied to the clutch CL3 increases. However, because the connection of the clutch CL3 has been completed, no shift shock arises due to increase of pressure oil.

Further, in the case of an upshift from the third speed to the fourth speed, the second solenoid valve 43 is switched from ON to OFF. At the same time, the first linear solenoid valve 45 and the second linear solenoid valve 46 are actuated to linearly shift to the upper position and the lower position, respectively, SO that pressure oil is discharged from the clutch CL3 and instead the clutch CL4 is supplied with pressure oil (transient period mode). The fourth speed stage is therefore formed.

Figure 9:
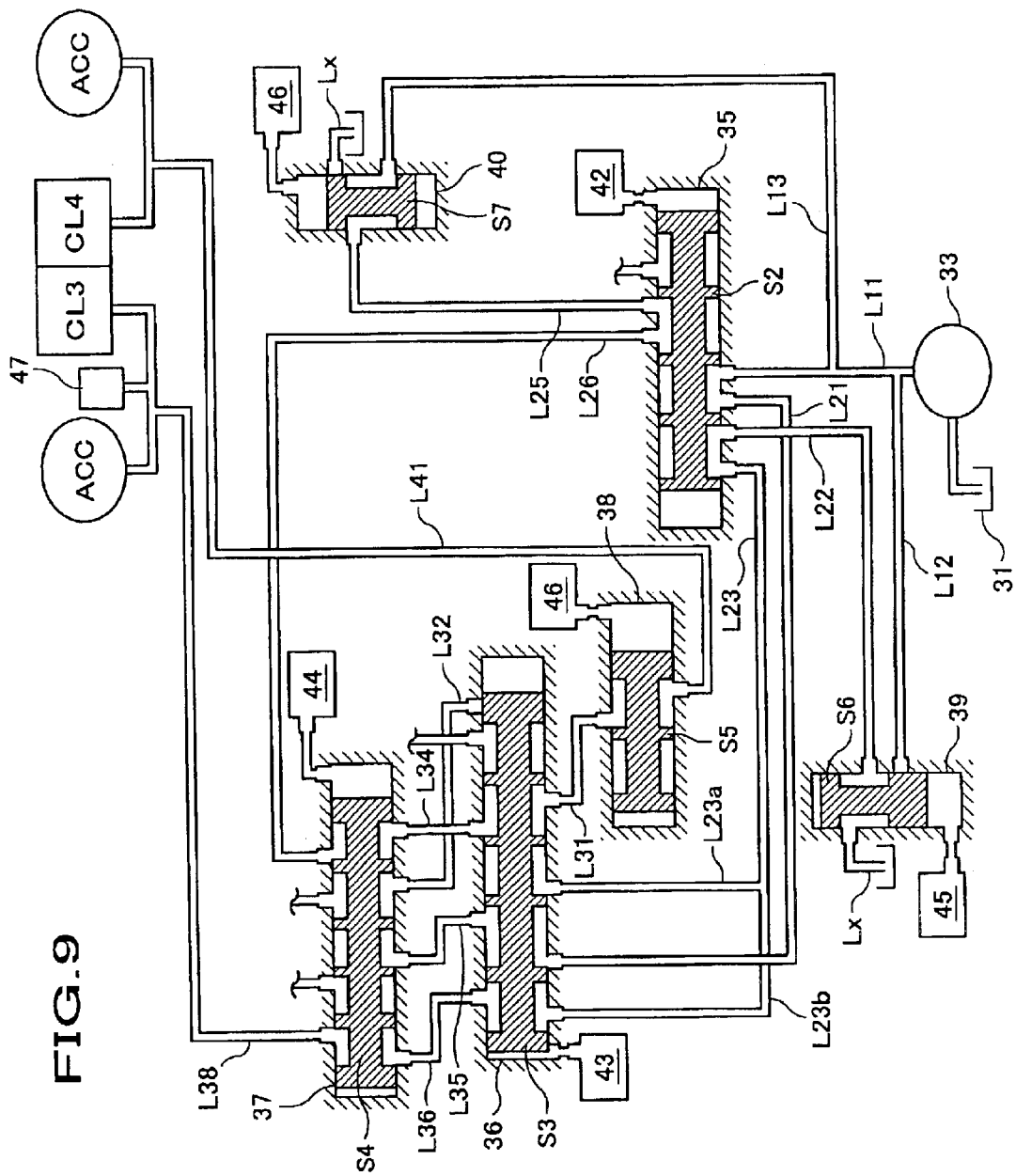
FIG. 9 is a hydraulic circuit diagram illustrating a transient state wherein the transmission shifts from the third speed stage to the fourth speed stage.

In this instance, as illustrated in FIG. 9, the spool S3 of the second shift valve 36 shifts to the left position, so that the pressure oil line L23b and the pressure oil line L36 are connected and the pressure oil line L31 and the pressure oil line L34 are connected. Meanwhile, the spool S6 of the first pressure regulating valve 39 gradually shifts to the upper position. The pressure oil that has been supplied to the clutch CL3 then flows through the pressure oil line L38 into the third shift valve 37, and through the pressure oil line L36 into the second shift valve 36, and further through the oil pressure line L23b (and the oil pressure line L23) into the first shift valve 35, and is discharged from the discharge port Lx of the first pressure regulating valve 39 via the pressure oil line L22.

At the same time, the spool S7 of the second pressure regulating valve 40 shifts to the lower position, and the spool S5 of the fourth shift valve 38 shifts to the left position. Pressure oil then flows from the pressure oil line L13 into the second pressure regulating valve 40, and through the pressure oil line L25 into the first shift valve 35, and further through the pressure oil line L26 into the third shift valve 37. Furthermore, pressure oil flows from the third shift valve 37 through the pressure oil line L34 into the second shift valve 36, and through the pressure oil line L31 into the fourth shift valve 38, and is gradually supplied to the clutch CL4 via the pressure oil line L41.

When the upshift to the fourth speed is completed, the first solenoid valve 42 is switched from ON to OFF, so that the spool S2 of the first shift valve 35 moves to the left position (line pressure mode). Therefore, the pressure oil line L11 and the pressure oil line L26 are connected at the first shift valve 35, and through this pressure oil circuit pressure oil is supplied to the clutch CL4. By switching the first solenoid valve 42, pressure oil applied to the clutch CL4 increases. However, because the connection of the clutch CL4 has been completed, no shift shock arises due to increase of pressure oil.

Next, description will be made on downshift operations from the respective speed stages in the normal mode in which regenerative braking is not performed. Also in the downshift operations, the instance where pressure oil is supplied to or discharged from the clutch via the first linear solenoid valve 45 or the second linear solenoid valve 46 is referred to as the "transient period mode", and the instance where pressure oil is retained without passing through the first and second linear solenoid valves 45, 46 is referred to as the "line pressure mode".

Figure 10:
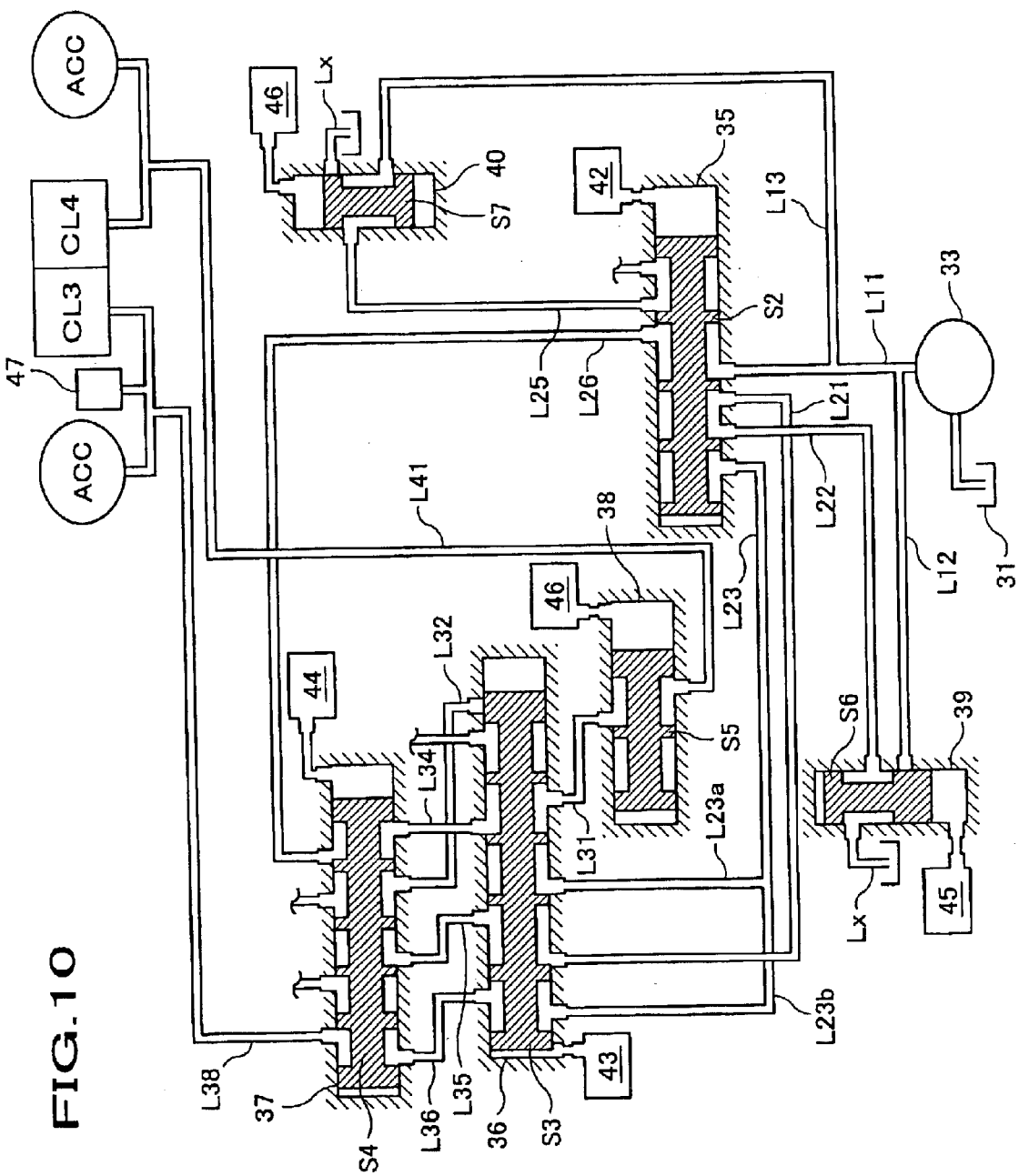
FIG. 10 is a hydraulic circuit diagram illustrating a state wherein the transmission holds the fourth speed stage.

In the case of a downshift from the fourth speed to the third speed, operation of the control apparatus is switched from the state in which the fourth speed stage is retained as illustrated in FIG. 10, in such a manner that the first solenoid valve 42 is switched from OFF to ON, the first linear solenoid valve 45 is shifted to the lower position, and the second linear solenoid valve 46 is shifted to the upper position.

Therefore, the spool S7 of the second pressure regulating valve 40 shifts from the lower position shown in FIG. 9 to the upper position, so that the connection of the pressure oil line L25 is switched from the pressure oil line L13 to the discharge port Lx. The pressure oil that has been supplied to the clutch CL4 is discharged from the discharge port Lx. Meanwhile, the spool S6 of the first pressure regulating valve 39 shifts from the upper position shown in FIG. 9 to the lower position, so that the connection of the pressure oil line L22 is switched from the discharge port Lx to the pressure oil line L12. Pressure oil is then supplied to the clutch CL3 from the hydraulic pump 33.

Figure 8:
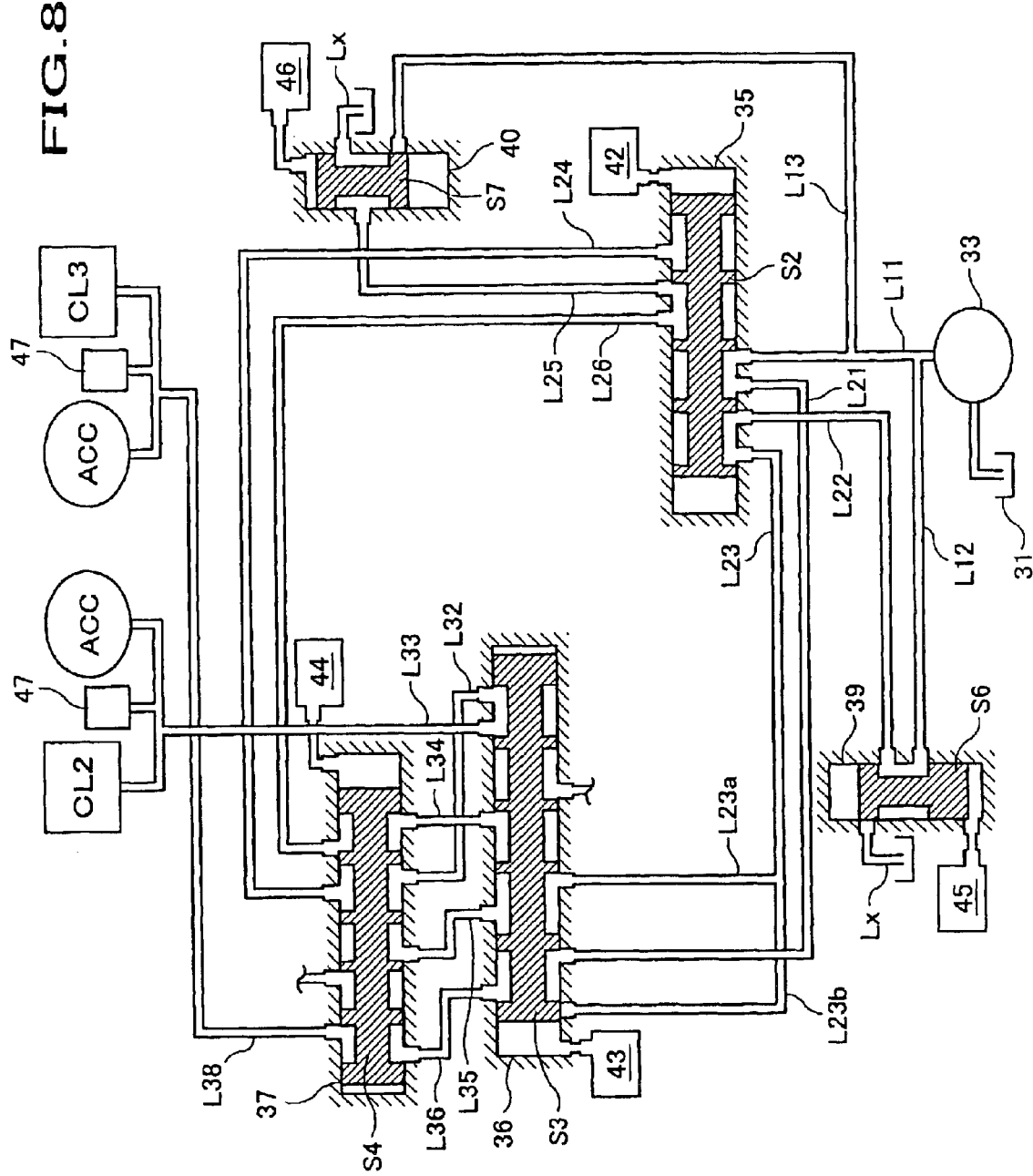
FIG. 8 is a hydraulic circuit diagram illustrating a state wherein the transmission holds the third speed stage.

When the downshift to the third speed stage is completed, the second solenoid valve 43 is switched from OFF to ON, and the hydraulic circuit shown in FIG. 8 is formed.

In the case of a downshift from the third speed to the second speed, operation of the control apparatus is switched from the state in which pressure oil is supplied to the clutch CL3 as illustrated in FIG. 8, in such a manner that the first solenoid valve 42 is switched from ON to OFF, the first linear solenoid valve 45 is shifted to the upper position, and the second linear solenoid valve 46 is shifted to the lower position.

Therefore, the spool S6 of the first pressure regulating valve 39 shifts from the lower position shown in FIG. 7 to the upper position, so that the connection of the pressure oil line L22 is switched from the pressure oil line L12 to the discharge port Lx. The pressure oil that has been supplied to the clutch CL3 is discharged from the discharge port Lx. Meanwhile, the spool S7 of the second pressure regulating valve 40 shifts from the upper position shown in FIG. 7 to the lower position, so that the connection of the pressure oil line L25 is switched from the discharge port Lx to the pressure oil line L13. Pressure oil is then supplied to the clutch CL2 from the hydraulic pump 33.

When the downshift to the second speed stage is completed, the third solenoid valve 44 is switched from OFF to ON, and the hydraulic circuit shown in FIG. 6 is formed.

Further, in the case of a downshift from the second speed to the first speed, operation of the control apparatus is switched from the state in which pressure oil is supplied to the clutch CL2 as illustrated in FIG. 6, in such a manner that the first solenoid valve 42 is switched from OFF to ON, the first linear solenoid valve 45 is shifted to the lower position, and the second linear solenoid valve 46 is shifted to the upper position.

Therefore, the spool S7 of the second pressure regulating valve 40 shifts from the lower position shown in FIG. 5 to the upper position, so that the connection of the pressure oil line L25 is switched from the pressure oil line L13 to the discharge port Lx. The pressure oil that has been supplied to the clutch CL2 is discharged from the discharge port Lx. Meanwhile, the spool S6 of the first pressure regulating valve 39 shifts from the upper position shown in FIG. 5 to the lower position, so that the connection of the pressure oil line L22 is switched from the discharge port Lx to the pressure oil line L12. Pressure oil is then supplied to the clutch CL1 from the hydraulic pump 33.

When the downshift to the first speed stage is completed, the second solenoid valve 43 is switched from ON to OFF, and the hydraulic circuit shown in FIG. 4 is formed.

In the transient period during which an upshift operation or a downshift operation is carried out, the first pressure regulating valve 39 and the second pressure regulating valve 40 are switched, so that supply of pressure oil from the hydraulic pump 33 and discharge of pressure oil from the discharge port Lx can be switched. Therefore, supply of pressure oil to each clutch CL1 to CL4 and discharge of pressure oil from each clutch CL1 to CL4 can be readily controlled. Furthermore, switching the first pressure regulating valve 39 and the second pressure regulating valve 40 is performed by the linear operational movement of the first linear solenoid valve 45 and the second linear solenoid valve 46. Therefore, no shift shock arises due to abrupt supply of pressure oil to the clutch CL1 to CL4.

Next, regenerative braking of the hybrid vehicle will be described, wherein the control apparatus 6 switches to the pressure regulating valve mode during the deceleration of the hybrid vehicle.

According to this preferred embodiment, the pressure regulating valve mode indicates a mode in which none of the clutches CL1 to CL4 are supplied with pressure oil at the time of regenerative braking by way of controlling the first pressure regulating valve 39 and the second pressure regulating valve 40 with the use of the first and second linear solenoid valves 45, 46. In this embodiment, the pressure regulating valve mode is achieved when both of the first and second pressure regulating valves 39, 40 are in the upper position. During the pressure regulating valve mode, the rotation of the output shaft 4 shown in FIG. 1 is not transmitted to the primary shaft 13. This enables deceleration energy of the hybrid vehicle to be regenerated by the motor 8 as electric energy, and the regenerative electric energy is obtained without a loss of energy due to the drag resistance of the engine.

With reference to the shift map of FIG. 11, difference of the amount of regenerative electric energy will be described for the cases with and without the use of the pressure regulating valve mode. In this example, the vehicle decelerates from the fourth speed to the third speed.

Figure 11:
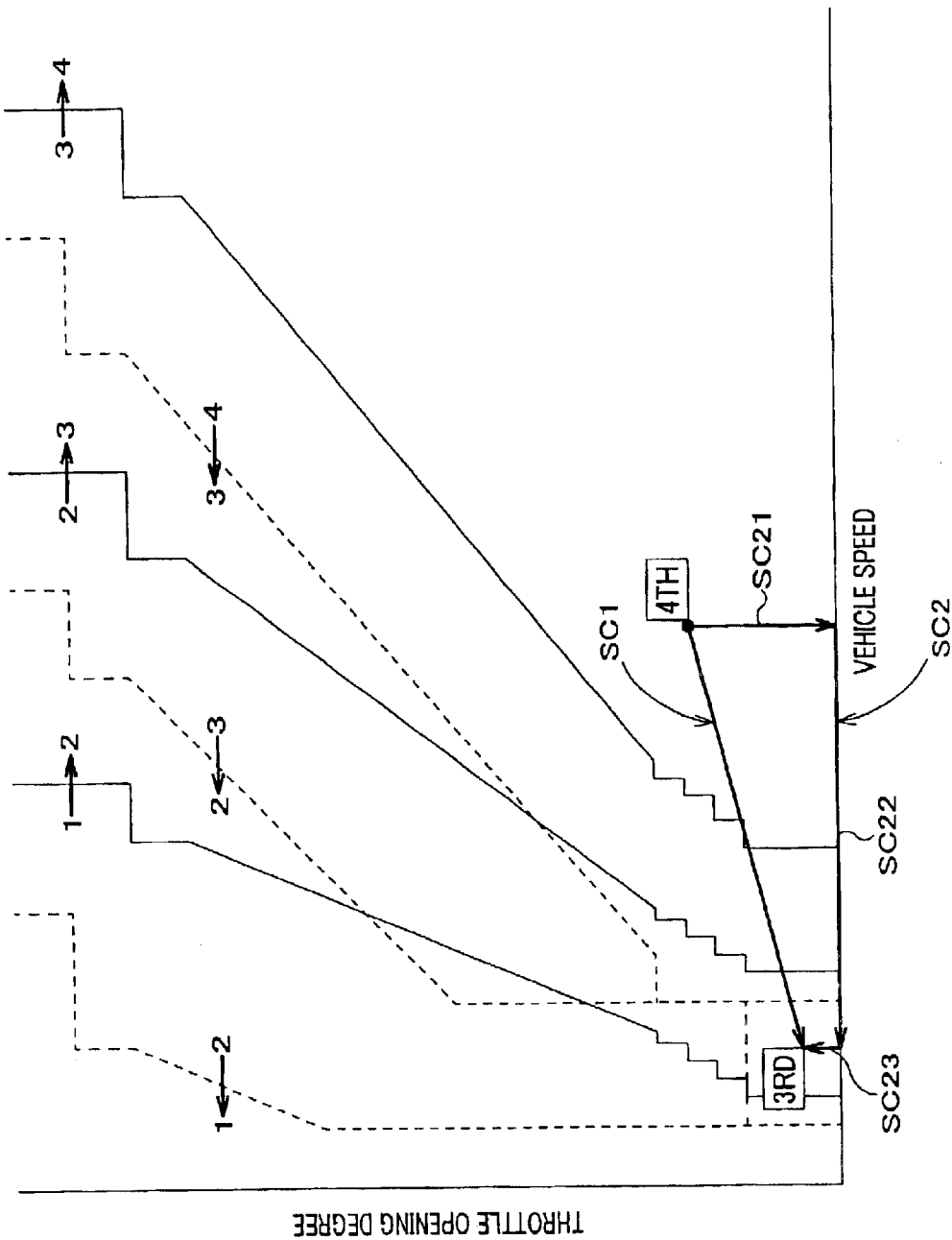
FIG. 11 is a schematic view illustrating a shift map of the hybrid vehicle.

In the case where regeneration is performed without utilizing the pressure regulating valve mode, a shift change is carried out in accordance with the line SC1 of FIG. 11, so that during the deceleration of the hybrid vehicle kinetic energy of the hybrid vehicle is regenerated as electric energy.

In this instance, changes of the shift position and the amount of regenerative energy at regular intervals are plotted in FIG. 12A. With reference to the graphs of vehicle speed and throttle opening degree shown in FIG. 12A, the throttle opening degree becomes zero at time point t1 and the hybrid vehicle starts to decelerate. The throttle is open again at time point t2, and after a certain time delay the vehicle reaccelerates at time point t3.

With reference to the graph of the amount of regenerative energy shown in the figure, electric energy corresponding to the area RC1 is regenerated during the deceleration from time point t1 to time point t2. However, because the fourth speed clutch CL4 remains engaged as shown in the graph of clutch pressure, the amount of regenerative energy becomes smaller for the drag resistance due to the clutch CL4.

On the contrary, in the case where regeneration is performed with the use of the pressure regulating valve mode, a shift change is carried out in accordance with the profile of SC2 shown in FIG. 11. In other words, instead of directly switching from the fourth speed to the third speed, the shift change is carried out from the fourth speed gear to the neutral state along the line SC21. The neutral state shown by the line SC22 is maintained until the vehicle speed decreases sufficiently, even in the case of coming across the shift point on the shifting line from the fourth speed to the third speed. Thereafter, the transmission is changed to the third speed along the line SC23.

In this instance, changes of the shift position and the amount of regenerative energy at regular intervals are plotted in FIG. 12B. Similar to FIG. 12A, change of throttle opening degree shown in FIG. 12B becomes zero in the range from time point t1 to time point t2. Electric energy corresponding to the area RC2 is regenerated during the deceleration of the hybrid vehicle.

When regenerative braking is performed with the use of the pressure regulating valve mode, as seen in the graph of clutch pressure shown in FIG. 12B, the pressure oil that has been supplied to the clutch CL4 is discharged at time point t1 and the clutch pressure of the clutch CL4 becomes zero. In this instance, because the third speed clutch CL3 is not supplied with pressure oil, the shift position of the hybrid vehicle is in the neutral state as shown in the graph of shift position. Therefore, drag resistance does not occur due to the clutch Cl1 to CL4, which leads to increased amount of regenerative electric energy when compared with the amount of regenerative energy RC1 shown in FIG. 12A.

Such a difference in the amount of regenerative energy becomes more prominent if the deceleration of the hybrid vehicle further continues after the downshift from the fourth speed to the third speed is completed. See FIGS. 13A and 13B.

Figure 13A:
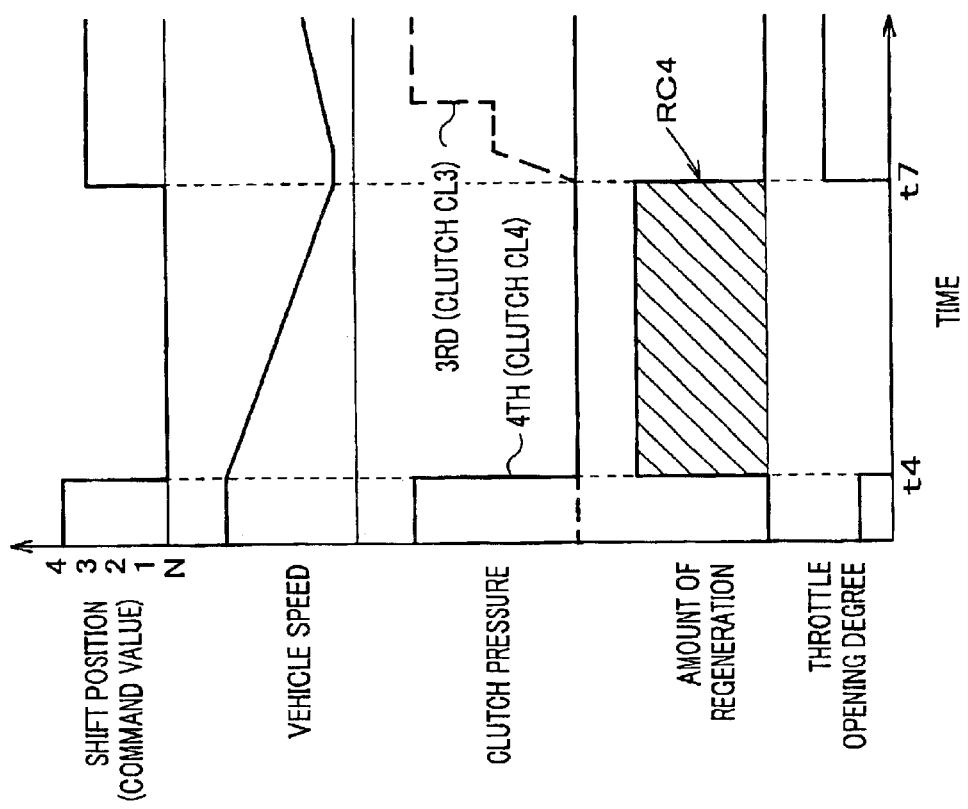
FIG. 13A is a graph showing the amount of regenerative electric energy obtained during regenerative braking without the use of a pressure regulating valve mode.

FIG. 13A is a graph showing the amount of regenerative electric energy obtained during regenerative braking without the use of the pressure regulating valve mode. As shown in the graph of throttle opening degree, the throttle opening degree becomes zero in the range from time point t4 to time point t7. During the time from t4 to t7, deceleration of the hybrid vehicle and regeneration of electric energy are performed as shown in the graphs of vehicle speed and the amount of regenerative energy.

In the graph of vehicle speed, the vehicle speed changes during deceleration. This is because the vehicle speed at time point t5 corresponds to the shift point from the fourth speed to the third speed and a shift change is actually made from the fourth speed to the third speed as shown in the graph of shift position. As seen in the graph of clutch pressure, the shift change is carried out in such a manner that at time point t5 the pressure oil supplied to the fourth speed clutch CL4 is discharged and instead the third speed clutch CL3 is supplied with pressure oil.

As to the amount of regenerative electric energy RC3 at the time of the shift change during the deceleration of the hybrid vehicle, the amount of energy (corresponding to the area RC31) is regenerated in the area from time point t4 to time point t5 wherein an energy loss is reduced by the drag resistance due to the clutch CL4. In the area from t5 to t6, the amount of energy (corresponding to the area RC32) is regenerated wherein an energy loss is reduced by the drag resistance to be generated between the amount of pressure oil remained in the clutch CL4 and the amount of pressure oil gradually supplied to the clutch CL3 in the course of changing the transmission stage. Further, in the area from t6 to t7, the amount of energy (corresponding to the area RC33) is regenerated wherein an energy loss is reduced by the drag resistance due to the clutch CL3.

Figure 13B:
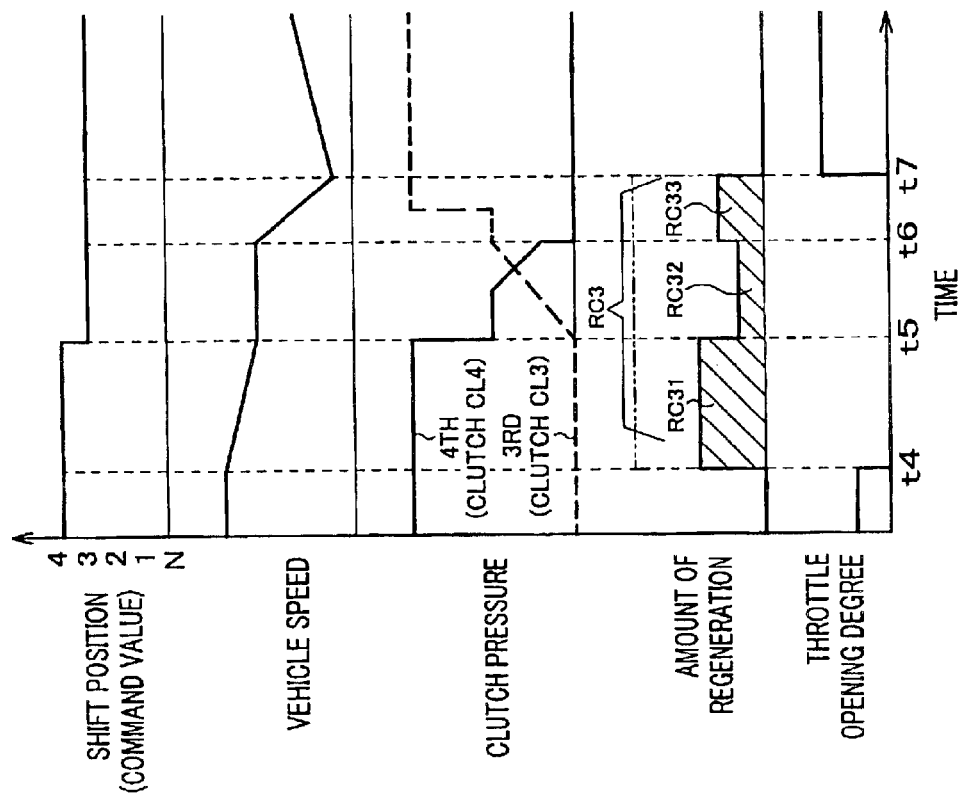
FIG. 13B is a graph showing the amount of regenerative electric energy with the use of the pressure regulating valve mode.

On the contrary, when regenerative braking is performed with the use of the pressure regulating valve mode as shown in FIG. 13B, like the shift change shown in FIG. 13A, the amount of energy corresponding to the area RC4 is regenerated in the area from t4 to t7 during which the throttle opening degree is zero.

As seen in the graph of clutch pressure shown in FIG. 13B, when the pressure regulating valve mode is utilized, the pressure oil that has been supplied to the fourth speed clutch CL4 is discharged at time point t4 and the clutch pressure of the clutch CL4 becomes zero. In this instance, pressure oil is not supplied to the third speed clutch CL3 either. Therefore, the shift position of the hybrid vehicle is maintained in the neutral state as shown in the graph of shift position, and no drag resistance occurs due to the clutch CL1 to CL4. As a result, an increased amount of regenerative energy is obtained when compared with the amount of regenerative energy RC3 shown in FIG. 13A.

Actual control of the control apparatus in the pressure regulating valve mode will be described below.

Regenerative braking in the pressure regulating valve mode is performed according to the flow chart of FIG. 14. Initially, the ECU determines driving conditions of the hybrid vehicle from the acceleration sensor, etc., in step S101. If the hybrid vehicle is decelerating, a determination is made in step S102 as to whether regeneration of the battery through the motor is required. If the hybrid vehicle decelerates beyond the regeneration limit of the motor, operation proceeds to step S103 and according to the map of FIG. 15A indicating the relation between throttle opening degree and vehicle speed, a downshift is carried out in the normal mode.

In FIG. 15A, the solid line indicates the relation between throttle opening degree and vehicle speed at the time of an upshift from the respective speed stages to a higher speed stage that is one speed stage higher than the current speed stage. For example, the solid line 1->2 indicates an upshift from the first speed to the second speed. Meanwhile, the broken line indicates the relation between throttle opening degree and vehicle speed at the time of a downshift from the respective speed stages to a lower speed stage that is one speed stage lower than the current speed stage. For example, the broken line 2->1 indicates a downshift from the second speed stage to the first speed stage. In the case of a downshift from the fourth speed to the third speed, as shown by arrow A of FIG. 15A, when the vehicle speed reaches to a certain vehicle speed A1 after deceleration, the control apparatus 6 discharges the pressure oil from the clutch CL4 and instead gradually supplies pressure oil to the clutch CL3. In the case of a downshift from the fourth speed to the second speed as shown by arrow B, a downshift to the third speed is made at a certain vehicle speed B1, and further a downshift to the second speed is made at a certain vehicle speed B2. Further, in the case of a downshift from the fourth speed to the first speed as shown by arrow C, a downshift to the third speed is made at a certain vehicle speed C1, and then a downshift to the second speed and the downshift to the first speed are made at the vehicle speed B2 and the vehicle speed C2, respectively.

Meanwhile, if regeneration is performed to charge the battery, operation proceeds to step S104. In step S104, ECU determines whether the speed stage (first speed stage: G ratio) during deceleration is greater than 1, that is, whether the hybrid vehicle decelerates with the transmission set in any one of the second through the fourth speed. If G ratio is greater than 1, then operation proceeds to the pressure regulating valve mode by the current transmission speed stage (first speed stage: G ratio) and a lower transmission speed stage (second speed stage: G ratio-1) (step S105).

For example, as shown by arrow A of FIG. 15A, if the deceleration from the fourth speed (G ratio=4) to the third speed (G ratio-1=3) is carried out with the use of the pressure regulating valve mode, the neutral state is maintained by the pressure regulating valve mode between the third speed and the fourth speed. When the vehicle speed decreases to a certain speed, pressure oil is supplied to the clutch CL3 to engage the clutch CL3. Therefore, the third speed is formed. In this instance, in the area AR shown in FIG. 15B, regenerative braking of the motor 8 is performed to charge the battery without causing a drag resistance due to the engine 1.

In the pressure regulating valve mode, the neutral state (step S106) is formed as follows. In step S106, P (G ratio)=0 indicates a state where pressure oil is not applied to the clutch that forms the transmission speed stage G ratio.

In the case of a downshift from the fourth speed to the third speed by the use of the pressure regulating valve mode, the first linear solenoid valve 45 and the second linear solenoid valve 46 are operated to simultaneously set the first pressure regulating valve 39 and the second pressure regulating valve 40 in the upper position as shown in the sequence diagram of FIG. 16. Therefore, as best seen in FIG. 9, the pressure oil that has been supplied to the clutch CL3 is discharged from the discharge port Lx of the first pressure regulating valve 39 via the pressure oil line L22 (P (3)=0), and the pressure oil that has been supplied to the clutch CL4 is discharged from the discharge port Lx of the second pressure regulating valve 40 via the pressure oil line L25 (P (4)=0).

In the case of a downshift from the fourth speed (G ratio=4) to the second speed (G ratio-2=0) as shown by arrow B of FIG. 15A, regenerative braking is preformed in the area BR with the use of the pressure regulating valve mode between the third speed and the fourth speed (P (4), P (3), P (2) are zero). Thereafter, from the neutral state, pressure oil is once supplied to the clutch CL3 and then supplied to the clutch CL2. The clutch CL2 is engaged through the engagement of the clutch CL3. This is to prevent a shift shock due to the engagement of the clutch CL2 or so-called surge resulting from a blow-up of the engine 1, both of which are caused by an increased difference between the number of rotation of the engine 1 and the number of rotation of the drive shaft.

In the case of a downshift from the fourth speed to the first speed as shown by arrow C of FIG. 15A, regenerative braking is performed in the area CR with the use of the pressure regulating valve mode between the third speed and the fourth speed. The clutch CL1 is engaged from the neutral state through the engagement of the clutch CL3. The reason to initially engage the clutch CL3 is the same as previously described. If necessary, the clutch CL2 may be engaged.

In the case of a downshift from the third speed to the second speed with use of the pressure regulating valve mode, and in the case of the downshift from the second speed to the first speed with use of the pressure regulating valve mode, the first linear solenoid valve 45 and the second linear solenoid valve 46 are operated to simultaneously set the first pressure regulating valve 39 and the second pressure regulating valve 40 in the upper position as shown in the sequence diagram of FIG. 16. Therefore, as best seen in FIG. 5 or FIG. 7, the pressure oil that has been supplied to either the clutch CL1 or the clutch CL3 is discharged from the discharge port Lx of the first pressure regulating valve 39 via the pressure oil line L22, and the pressure oil that has been supplied to the clutch CL2 is discharged from the discharge port Lx of the second pressure regulating valve 40 via the pressure oil line L25.

If regenerative braking is performed with the transmission set in the first speed in step S104, operation proceeds to step S107. In step S107, regenerative braking is performed in the pressure regulating valve mode between the first speed and the second speed according to the sequence diagram of FIG. 16.

According to this preferred embodiment, in the transient period during which the transmission stage is switched, the first linear solenoid valve 45 and the second linear solenoid valve 46 are controlled such that pressure oil is immediately discharged from or gradually supplied to the two clutches to be selected from the clutches CL1 to CL4. In the normal mode that is after the transient period, pressure oil is directly supplied to the clutches CL1 to CL4 without passing through the first and second linear solenoid valves 45, 46.

Further, pressure oil is discharged from the two clutches to be selected from the clutches CL1 to CL4 during regenerative braking, and the first and second linear solenoid valves 45, 46 are controlled to form the neutral state. This prevents the drag resistance of the clutches CL1 to CL4 and enables the maximum regenerative electric energy obtained during the regenerative braking. Like the normal mode without the use of the first and second pressure regulating valves 39, 40, pressure oil is not supplied to other clutches unless the clutch is engaged.

Figure 17:
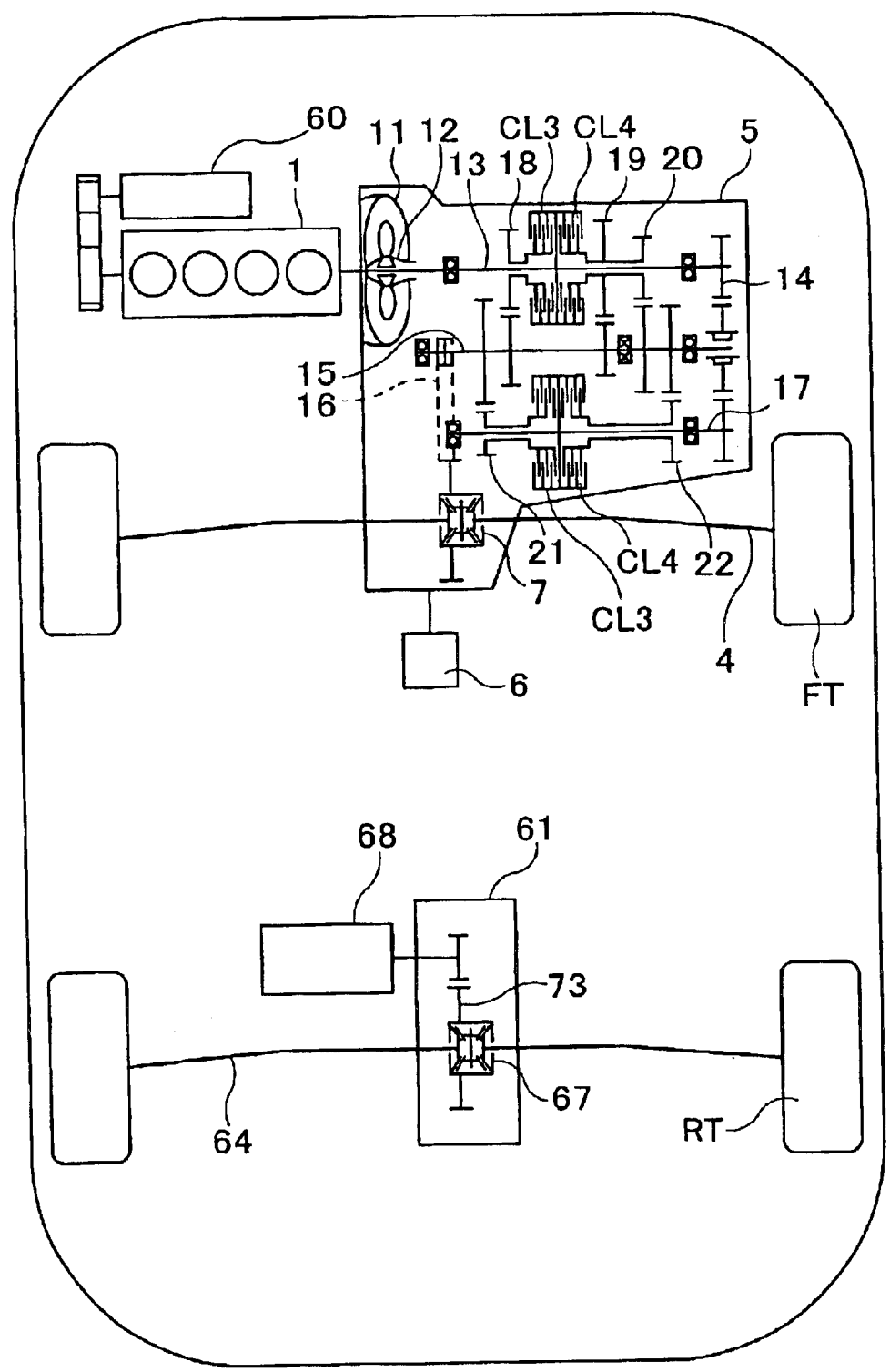
FIG. 17 shows a system arrangement of the parallel hybrid vehicle including the hydraulically operated control apparatus.

While the present invention has been described in detail with reference to specific embodiment thereof, it will be apparent to one skilled in the art that various changes and modifications may be made without departing from the scope of the claims. For example, instead of the motor 2 shown in FIG. 1, a starter which does not directly pertain to the rotation of the crank shaft 3 may be provided to start the engine 1. Also, as shown in FIG. 17, front wheels FT may be driven by the engine 1 which is actuated by the starter 60, while rear wheels RT may be driven by a motor unit 61. The motor unit 61 is provided with a motor 68, which is connected to the output shaft 64 of the rear wheels RT through differential gears 67 and a final gear 73. During regenerative braking, regenerative energy is charged to a non-illustrated battery through the motor 68. In this hybrid vehicle, according to road conditions, vehicle speed, etc., drive of the wheels can be switched between front-wheel drive only by the engine 1, rear-wheel drive only by the motor 68, and four-wheel drive by the engine 1 and the motor 68, to thereby improve the fuel efficiency or to decrease the amount of emission gas. In this instance, even if the motor 2 shown in FIG. 1 may be employed instead of the starter 60, such a hybrid vehicle operates in the same manner.

Further, instead of the transmission 5 shown in FIG. 1 and FIG. 17, a five speed transmission may be employed. In this instance, in order to selectively supply pressure oil to five clutches CL1 to CL5, it is necessary to additionally provide pressure lines, a shift valve, and a pressure regulating valve in the hydraulic circuit shown in FIG. 2. Further, it is necessary to provide a solenoid valve and a linear solenoid valve to control these elements. Like the aforementioned pressure regulating valve mode, operation of the pressure regulating valve is controlled by the linear solenoid valve at the time of regenerative braking, so that pressure oil is supplied to or discharged from two or three clutches to be selected from the clutches CL1 to CL5. Therefore, the five speed transmission operates in the same manner as the four speed transmission 5.

Furthermore, the control apparatus according to the invention is applicable to a hybrid vehicle with a manual transmission. In this instance, a main clutch or a dog clutch is used as power connect/disconnect means. As long as constructed to switch a plurality of power connect/disconnect means, the control apparatus according to the invention may be applicable to any types of control apparatus for the transmission, such as electrically-operated or mechanically-operated type.

What is claimed is:

1. A control apparatus for controlling a transmission of a hybrid vehicle, the hybrid vehicle comprising:
    an engine;
    a motor for transmitting power to wheels independently of the engine; and
    a transmission arranged between the engine and the wheels and having at least one power connect/disconnect means,
    wherein the control apparatus includes a controller for engaging or disengaging the power connect/disconnect means in accordance with driving conditions and wherein the controller is controlled to disengage the power connect/disconnect means during regeneration of the motor.

2. A control apparatus according to claim 1, wherein the transmission forms a plurality of speed stages by engaging or disengaging a plurality of friction elements, and wherein the transmission is constructed to select a first friction element which forms a speed stage just before the regeneration of the motor and a second friction element which forms a speed stage lower than that formed by the first friction element during the regeneration of the motor, and the transmission stands ready to engage the first and second friction elements during the regeneration of the motor.

3. A control apparatus according to claim 1, wherein the power connect/disconnect means is disengaged during regeneration of the motor, so that rotation of the engine is not transmitted to the wheels.

* * * * *